US008406774B2

(12) United States Patent
Yavuz et al.

(10) Patent No.: US 8,406,774 B2
(45) Date of Patent: *Mar. 26, 2013

(54) METHODS AND SYSTEMS FOR SERVER SELECTION DURING FEEDBACK CHANNEL IMPAIRMENT IN WIRELESS COMMUNICATIONS

(75) Inventors: Mehmet Yavuz, San Diego, CA (US); Sarut Vanichpun, San Diego, CA (US); Yeliz Tokgoz, La Jolla, CA (US); Matthew Stuart Grob, La Jolla, CA (US); Peter John Black, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 1259 days.

This patent is subject to a terminal disclaimer.

(21) Appl. No.: 11/506,108

(22) Filed: Aug. 16, 2006

(65) Prior Publication Data
US 2007/0042781 A1 Feb. 22, 2007

Related U.S. Application Data

(60) Provisional application No. 60/708,529, filed on Aug. 16, 2005.

(51) Int. Cl.
*H04W 40/00* (2009.01)
(52) U.S. Cl. ...................................................... 455/445
(58) Field of Classification Search .................. 455/445, 455/450, 452.1, 403, 436–444, 524, 525, 455/561, 452.2, 453, 455, 464, 509, 515–517, 455/560; 370/331, 332, 328, 389, 252, 392, 370/229, 519
See application file for complete search history.

(56) References Cited

U.S. PATENT DOCUMENTS

| 6,707,856 | B1 | 3/2004 | Gardner et al. |
| 6,901,254 | B2 * | 5/2005 | Ahn ........................... 455/422.1 |
| 6,985,453 | B2 | 1/2006 | Lundby et al. |
| 6,990,137 | B2 | 1/2006 | Smee et al. |
| 7,050,759 | B2 | 5/2006 | Gaal et al. |
| 7,065,060 | B2 | 6/2006 | Yun et al. |
| 7,215,653 | B2 | 5/2007 | Kim et al. |

(Continued)

FOREIGN PATENT DOCUMENTS

| DE | 10141971 A1 | 3/2003 |
| EP | 1083719 A2 | 3/2001 |

(Continued)

OTHER PUBLICATIONS

3GPP2: "cdma2000 High Rate Packet Data Air Interface Specification," 3GPP2 C.S0024-A Version 1.0, Mar. 2004, pp. 11-90 to 11-120, URL: http://www.3gpp2.org/Public_html/specs/C.S0024-A_v1.0_040331.pdf.

(Continued)

Primary Examiner — Melody Mehrpour
(74) Attorney, Agent, or Firm — Kristine U. Ekwueme

(57) ABSTRACT

Embodiments disclosed herein relate to methods and systems for server selection during feedback channel impairment in wireless communications. The feedback channel may be provided by a data rate control (DRC) channel, transmitted from an access terminal to an access network relating the selected serving sector (DRC cover) and the desired data rate (DRC rate) for transmission on forward link. During DRC cover erasure (e.g., due to channel impairment), a data source control (DSC) channel may be used as complimentary information to assist the DRC erasure mapping decision at the access network.

37 Claims, 23 Drawing Sheets

U.S. PATENT DOCUMENTS

| | | | | |
|---|---|---|---|---|
| 7,305,461 | B2* | 12/2007 | Ullman | 709/223 |
| 7,424,294 | B2* | 9/2008 | Proctor et al. | 455/436 |
| 7,636,582 | B2* | 12/2009 | Bi et al. | 455/522 |
| 2001/0014101 | A1 | 8/2001 | Spruyt et al. | |
| 2003/0054773 | A1* | 3/2003 | Vanghi | 455/70 |
| 2004/0101046 | A1 | 5/2004 | Yang et al. | |
| 2004/0196800 | A1 | 10/2004 | Padovani et al. | |
| 2005/0053023 | A1 | 3/2005 | Rajkotia et al. | |
| 2006/0098580 | A1 | 5/2006 | Li et al. | |
| 2006/0146721 | A1* | 7/2006 | Attar et al. | 370/238 |
| 2006/0171356 | A1 | 8/2006 | Gurelli et al. | |
| 2006/0176815 | A1* | 8/2006 | Picot et al. | 370/235 |
| 2006/0252428 | A1* | 11/2006 | Agashe et al. | 455/436 |
| 2007/0042780 | A1 | 2/2007 | Attar et al. | |

FOREIGN PATENT DOCUMENTS

| | | | |
|---|---|---|---|
| EP | 1227603 | A1 | 7/2002 |
| JP | 2002118514 | | 4/2002 |
| JP | 2002171572 | A | 6/2002 |
| JP | 2002535903 | | 10/2002 |
| JP | 2004080306 | A | 3/2004 |
| JP | 2004533750 | | 11/2004 |
| JP | 2005508588 | | 3/2005 |
| JP | 2005512473 | | 4/2005 |
| JP | 2005524252 | T | 8/2005 |
| JP | 2008524946 | | 7/2008 |
| JP | 2008536408 | T | 9/2008 |
| KR | 20040008230 | | 1/2004 |
| KR | 20040009762 | A | 1/2004 |
| RU | 2236761 | C2 | 9/2004 |
| WO | WO0036867 | A1 | 6/2000 |
| WO | WO03001838 | A1 | 1/2003 |
| WO | WO03009633 | A1 | 1/2003 |
| WO | WO03034646 | A2 | 4/2003 |
| WO | WO03034775 | | 4/2003 |
| WO | WO03051076 | | 6/2003 |
| WO | WO2004038988 | | 5/2004 |
| WO | WO2005018180 | | 2/2005 |

OTHER PUBLICATIONS

Bhushan, et al.: "CDMA2000 1XEV-DO Revision A: A physical layer and MAC layer overview," IEEE Communications Magazine, IEEE Service Center, Piscataway, NJ, US, vol. 44, No. 2, Feb. 1, 2006, pp. 75-87, ISSN: 0163-6804.

Bhushan, N. et al. "Detailed Description for QUALCOMM's RL Physical-layer Proposal for HRPD Rev.A Enhancement," 3GPP2, C30-DOAH-20030915-210, (Sep. 15, 2003).

"cdma2000 High rate Packet Data Air Interface Specification," TIA/EIA/IS-856 (also known as CDMA2000 1xEV-DO) Nov. 2000.

cdma2000 High Rate Packet Data Air Interface Specification, 3GPP2 CS0024, Ver 4.0, Oct. 25, 2002.

"cdma2000 High Rate Packet Data Air Interface Specification," 3GPP2 C.S0024-A, Version 2.0, Jul. 2005.

DN Knisely, Chair, 3GPP2 TSG-C SWG 2.5: "Overview of HRPD Rev. A for TSG." Jun. 24, 2004, pp. 1-38, XP002416900.

Ekpenyong, et al., "Markov Channel-Based Feedback Schemes for Adaptive ModulationSystems", Global Telecommunications Conference, 2004. Globecom 2004. IEEE Dallas, TX, USA Nov. 29-Dec. 2004, Piscataway, NJ, USA, IEEE, vol. 2, Nov. 29, 2004, pp. 1091-1095, XP010757690 ISBN: 0-7803-8794-5.

European Search Report—EP09153905, Search Authority—Munich Patent Office, Apr. 7, 2009.

European Search Report—EP10170126, Search Authority—Munich Patent Office, Sep. 7, 2010.

International Search Report—PCT/US2006/032063, European Patent Office, Apr. 4, 2007.

Mingxi Fan et al: "On the reverse link performance of cdma2000 1xEV-DO revision a system" Communications, 2005. ICC 2005. 2005 IEEE International Conference on Seoul, Korea, May 16-20, 2005, Piscataway, NJ, ISA, IEEE, May 16, 2005, pp. 2244-2250, XP010826268.

Qi Bi, "A Forward Link Performance Study of the 1xEV-DO Rev. 0 System Using Field Measurements and Simulations," Bell Labs Technical Journal, vol. 10, No. 2, Aug. 3, 2005, pp. 5-19, XP002425903.

Taiwan Search Report—TW095130166—TIPO—Mar. 16, 2010.

Tokgoz Y et al: "On the reverse link performance of the CDMA2000 IxEV-DO revision a system with antenna array receivers" Global Telecommunications Conference, 2005. Globecom "05. IEEE St. Loius, MO, USA Nov. 28-Dec. 2, 2005, Piscataway, NJ, USA, IEEE, vol. 6, Nov. 28, 2005, pp. 3373-3377, XP010882692 ISBN: 978-0-7803-9414-8 *chapter I I*.

Written Opinion—PCT/US2006/032063, European Patent Office, Apr. 4, 2007.

"A Forward Link Performance Study of the 1xEV-DO Rev. 0 System Using Field Measurements and Simulations", Lucent Technologies Bell Labs Innovations, Mar. 2004, URL: http://www.cdg.org/resources/files/white_papers/Lucent%201xEV-DO%20Rev%20O%20Mar%2004.pdf.

* cited by examiner

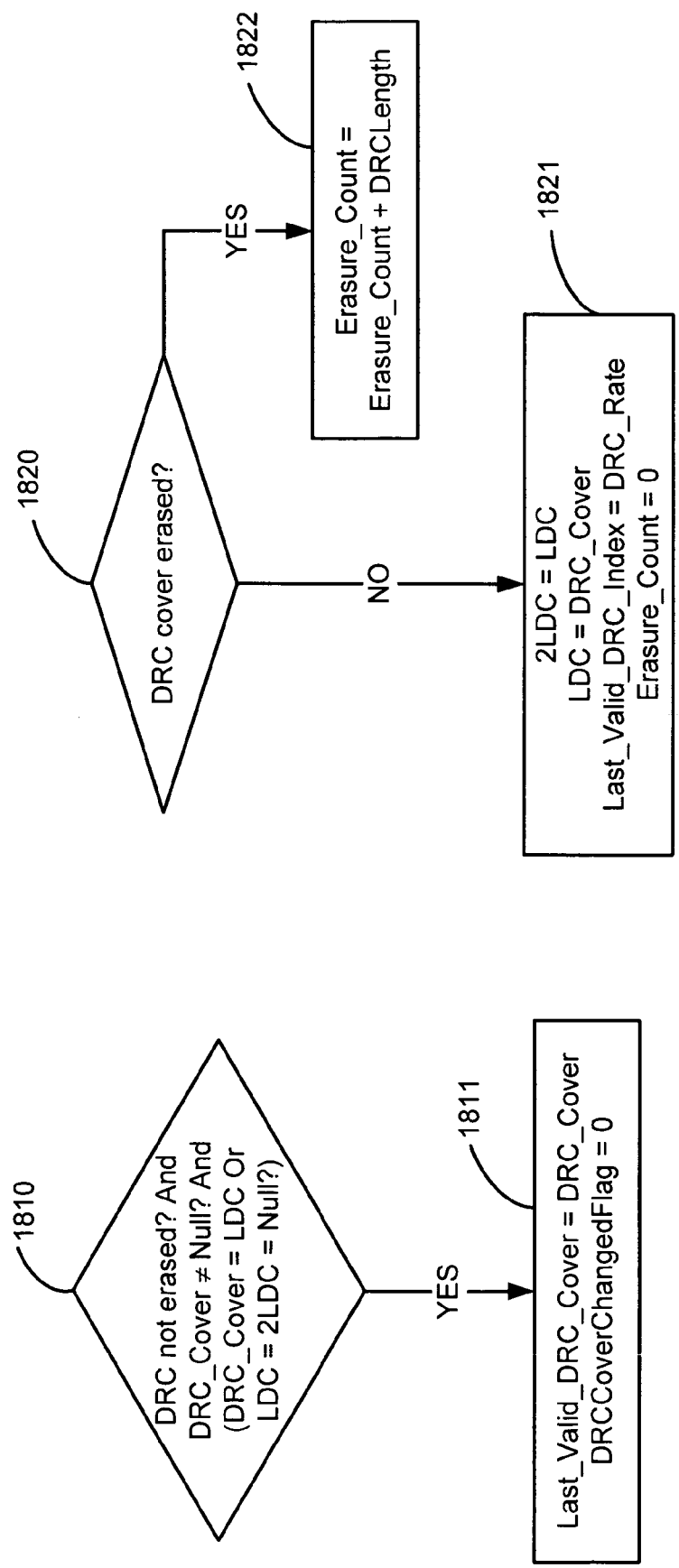

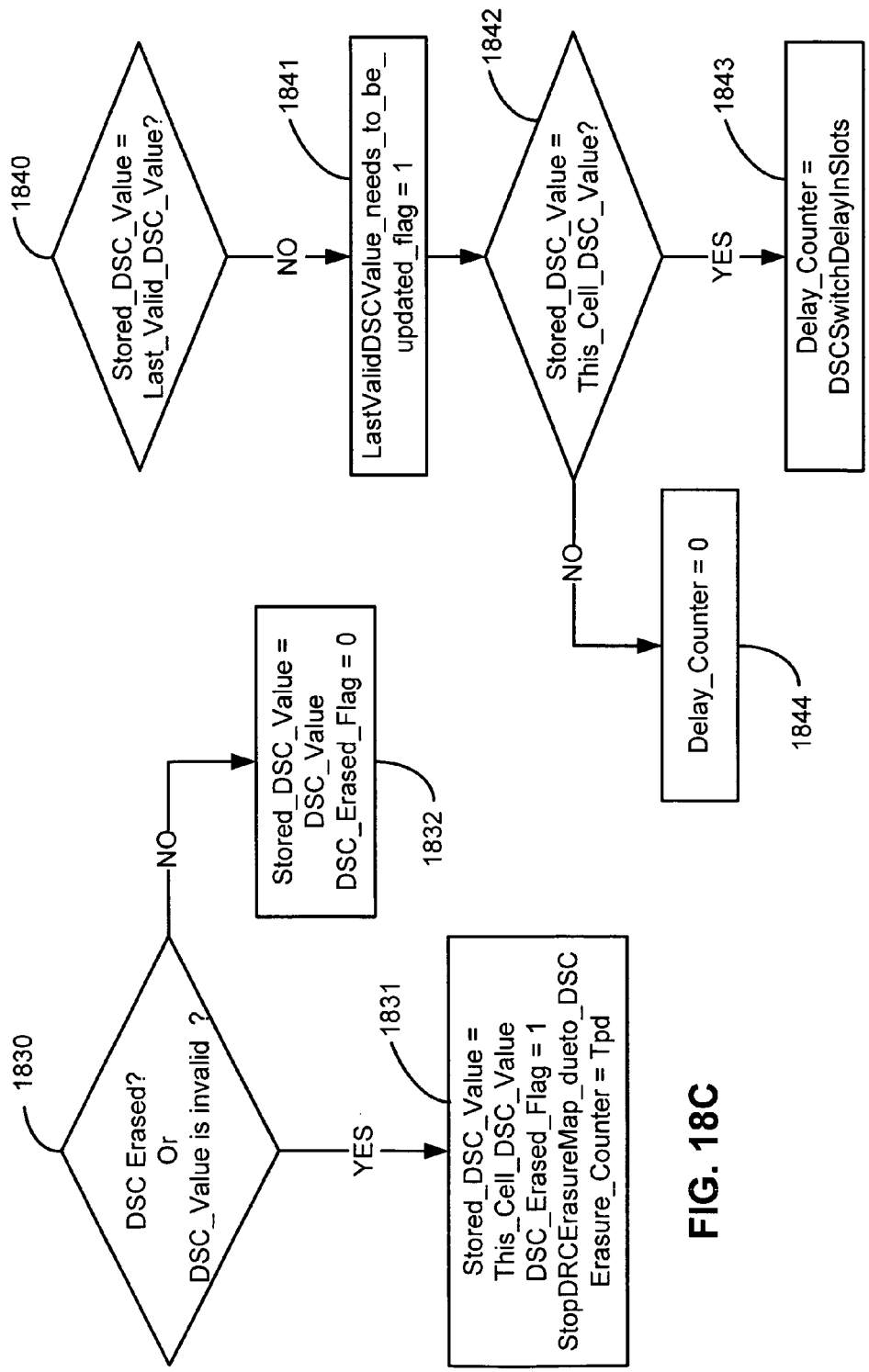

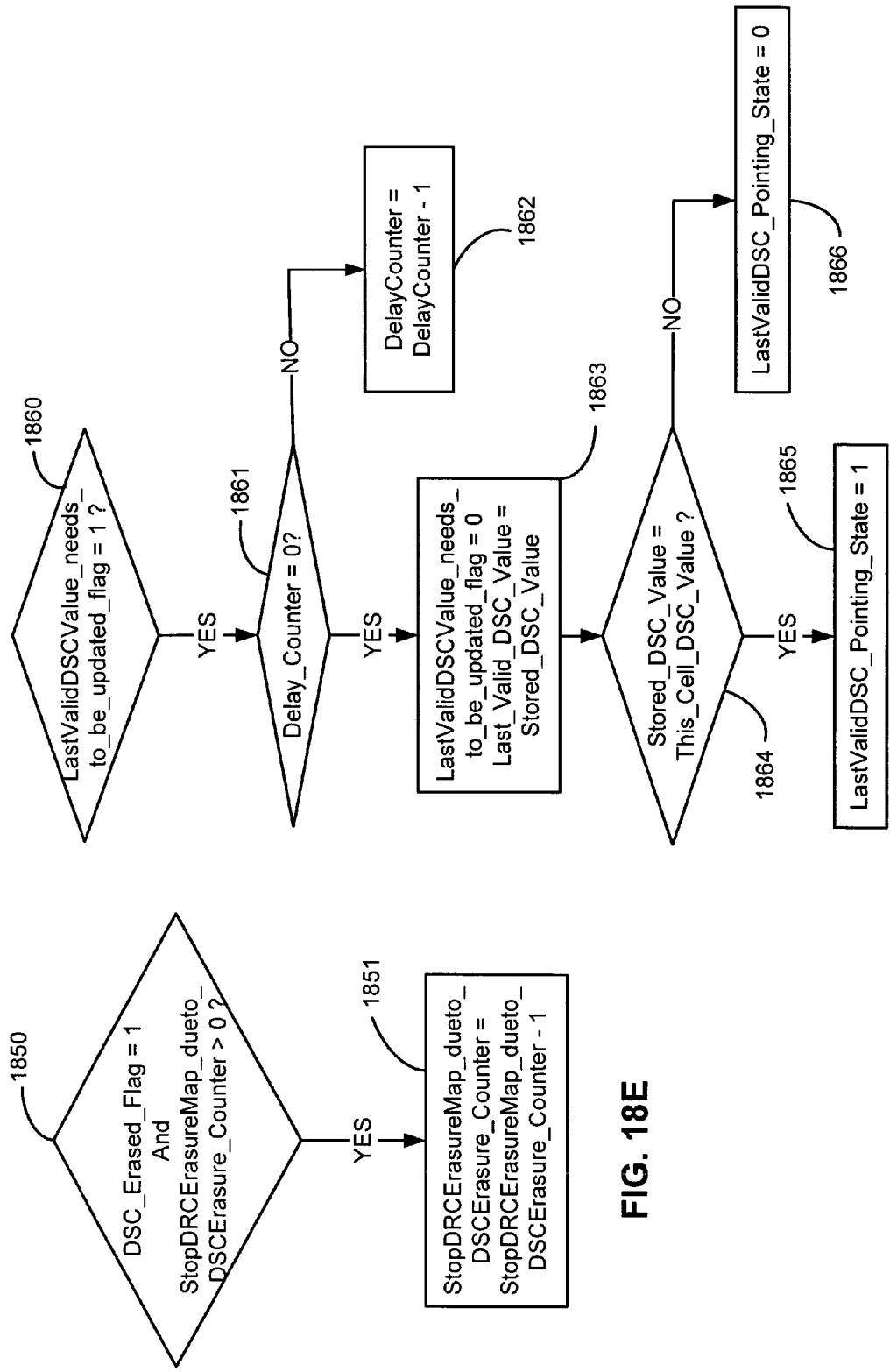

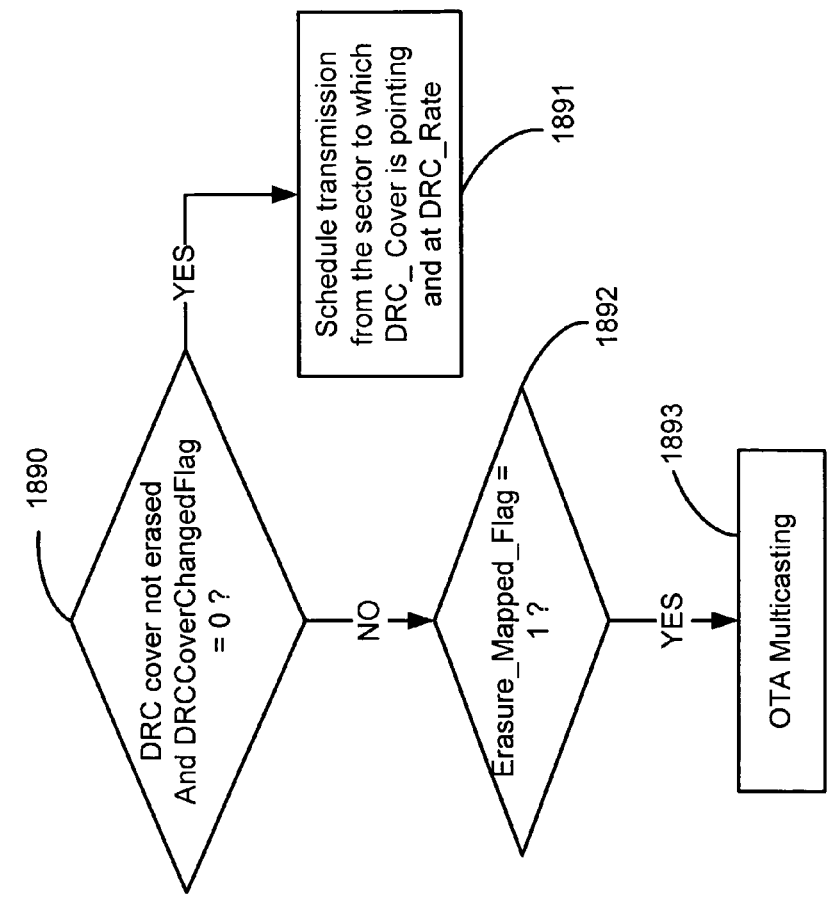
FIG. 18I
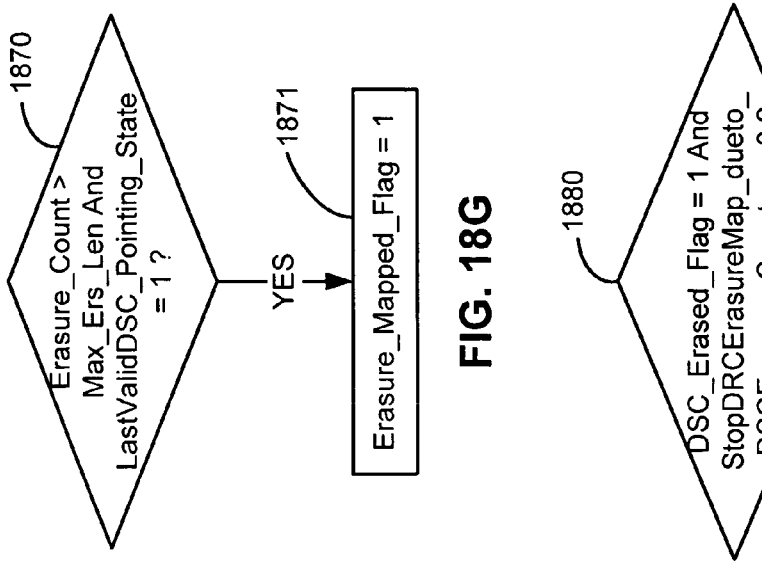
FIG. 18G
FIG. 18H

US 8,406,774 B2

METHODS AND SYSTEMS FOR SERVER SELECTION DURING FEEDBACK CHANNEL IMPAIRMENT IN WIRELESS COMMUNICATIONS

CLAIM OF PRIORITY UNDER 35 U.S.C. §119

This Application for Patent claims priority to U.S. Provisional Application No. 60/708,529, entitled "Methods and Systems for Adaptive Server Selection in Wireless Communications," filed on Aug. 16, 2005, which is assigned to the assignee hereof and hereby expressly incorporated by reference herein.

REFERENCE TO CO-PENDING APPLICATION FOR PATENT

This Application is related to a co-pending U.S. patent application Ser. No. 11/344,698, entitled "Method and Apparatus for Controlling a Transmission Data Rate Based on Feedback Relating to Channel Conditions," filed on Jan. 31, 2006, which is assigned to the assignee hereof and expressly incorporated by reference herein.

BACKGROUND

1. Field

This disclosure relates generally to communication systems. More specifically, embodiments disclosed herein relate to server selection during feedback channel impairment in wireless communications.

2. Background

Wireless communication systems are widely deployed to provide various types of communications (e.g., voice, data, etc.) to multiple users. Such systems may be based on code division multiple access (CDMA), time division multiple access (TDMA), frequency division multiple access (FDMA), or other multiple access techniques. A wireless communication system may be designed to implement one or more standards, such as IS-95, cdma2000, IS-856, W-CDMA, TD-SCDMA, and other standards.

As wireless communication systems strive to provide diverse services at ever higher data rates to a growing number of users, a challenge lies in enhancing the quality of service and improving the network efficiency.

BRIEF DESCRIPTION OF THE DRAWINGS

FIGS. 18A-I illustrate flow charts of several processes, which may be used to implement features illustrated in FIG. 17;

DETAILED DESCRIPTION

Embodiments disclosed herein relate to methods and systems for providing adaptive server selection in wireless communications.

An access point (AP) disclosed herein may include and/or implement functions of a base-station transceiver system (BTS), an access network transceiver (ANT), a modem pool transceiver (MPT), or a Node B (e.g., in a W-CDMA type system), etc. A cell may refer to a coverage area serviced by an AP. A cell may further include one or more sectors. Further, an access network controller (ANC) may refer to the portion of a communication system configured to interface with a core network (e.g., a packet data network) and route data packets between access terminals (ATs) and the core network, perform various radio access and link maintenance functions (such as soft handoff), control radio transmitters and receivers, and so on. An ANC may include and/or implement the functions of a base station controller (BSC), such as found in a $2^{nd}$, $3^{rd}$, or $4^{th}$ generation wireless network. An ANC and one or more APs may constitute part of an access network (AN).

An AT disclosed herein may refer to various types of devices, including (but not limited to) a wireless phone, a cellular phone, a laptop computer, a multimedia wireless device, a wireless communication personal computer (PC) card, a personal digital assistant (PDA), an external or internal modem, etc. An AT may be any data device that communicates through a wireless channel and/or through a wired channel (e.g., by way of fiber optic or coaxial cables). An AT may have various names, such as access unit, access node, subscriber unit, mobile station, mobile device, mobile unit, mobile phone, mobile, remote station, remote terminal, remote unit, user device, user equipment, handheld device, etc. Different ATs may be incorporated into a system. ATs may be mobile or stationary, and may be dispersed throughout a communication system. An AT may communicate with one or more APs on a forward link (FL) and/or a reverse link (RL) at a given moment.

Figure 1:
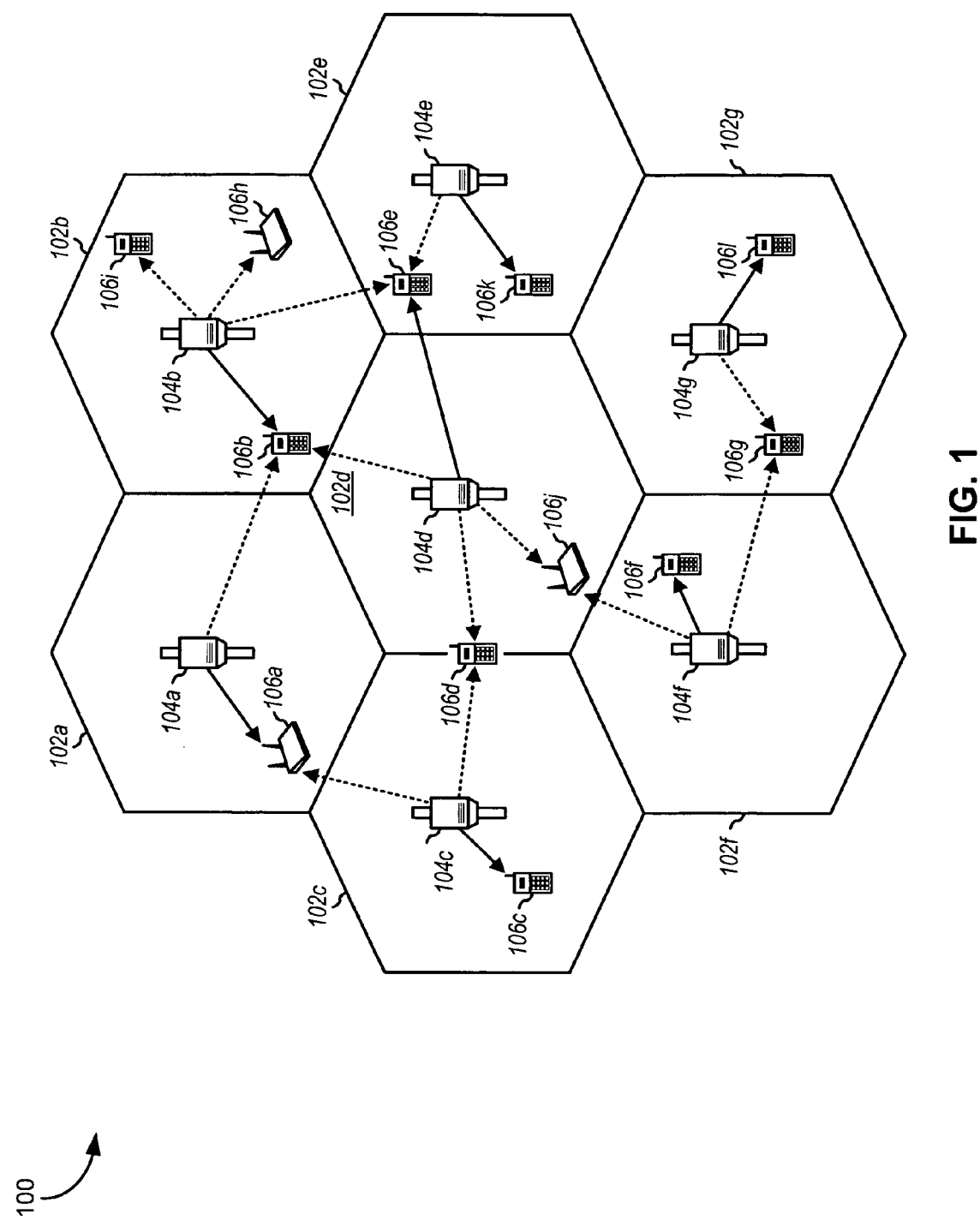
FIG. 1 illustrates an embodiment of a wireless communication system.

FIG. 1 illustrates a wireless communication system 100 configured to support a number of users, in which various disclosed embodiments and aspects may be implemented, as further described below. By way of example, system 100 provides communication for a number of cells 102, including cells 102a-102g, with each cell being serviced by a corresponding AP 104 (such as APs 104a-104g). Each cell may be further divided into one or more sectors. Various ATs 106, including ATs 106a-106k, are dispersed throughout the system. Each AT 106 may communicate with one or more APs 104 on a forward link and/or a reverse link at a given moment, depending upon whether the AT is active and whether it is in soft handoff, for example.

In FIG. 1, a solid line with an arrow may indicate information (e.g., data) transmission from an AP to an AT. Broken lines each with an arrow may indicate that the AT is receiving pilot and other signaling/reference signals from the respective APs (e.g., those in the AT's active set), as further described below. For clarity and simplicity, the reverse link communication is not explicitly shown in FIG. 1.

In a high rate packet data (HRPD) system (e.g., as specified in "cdma2000 High Rate Packet Data Air Interface Specification," 3GPP2 C.S0024-0 Version 4.0, Oct. 25, 2002, referred to herein as a "1xEV-DO Release 0" type system; "cdma2000 High Rate Packet Data Air Interface Specification," 3GPP2 C.S0024-A, Version 2, July 2005, referred to herein as a "1xEV-DO Revision A" type system, etc.), for example, transmission on forward link is partitioned into a sequence of frames; each frame is further divided into time slots (e.g., 16 slots each with a duration of 1.667 msec); and each slot includes a plurality of time-division-multiplexed channels.

Figure 2:
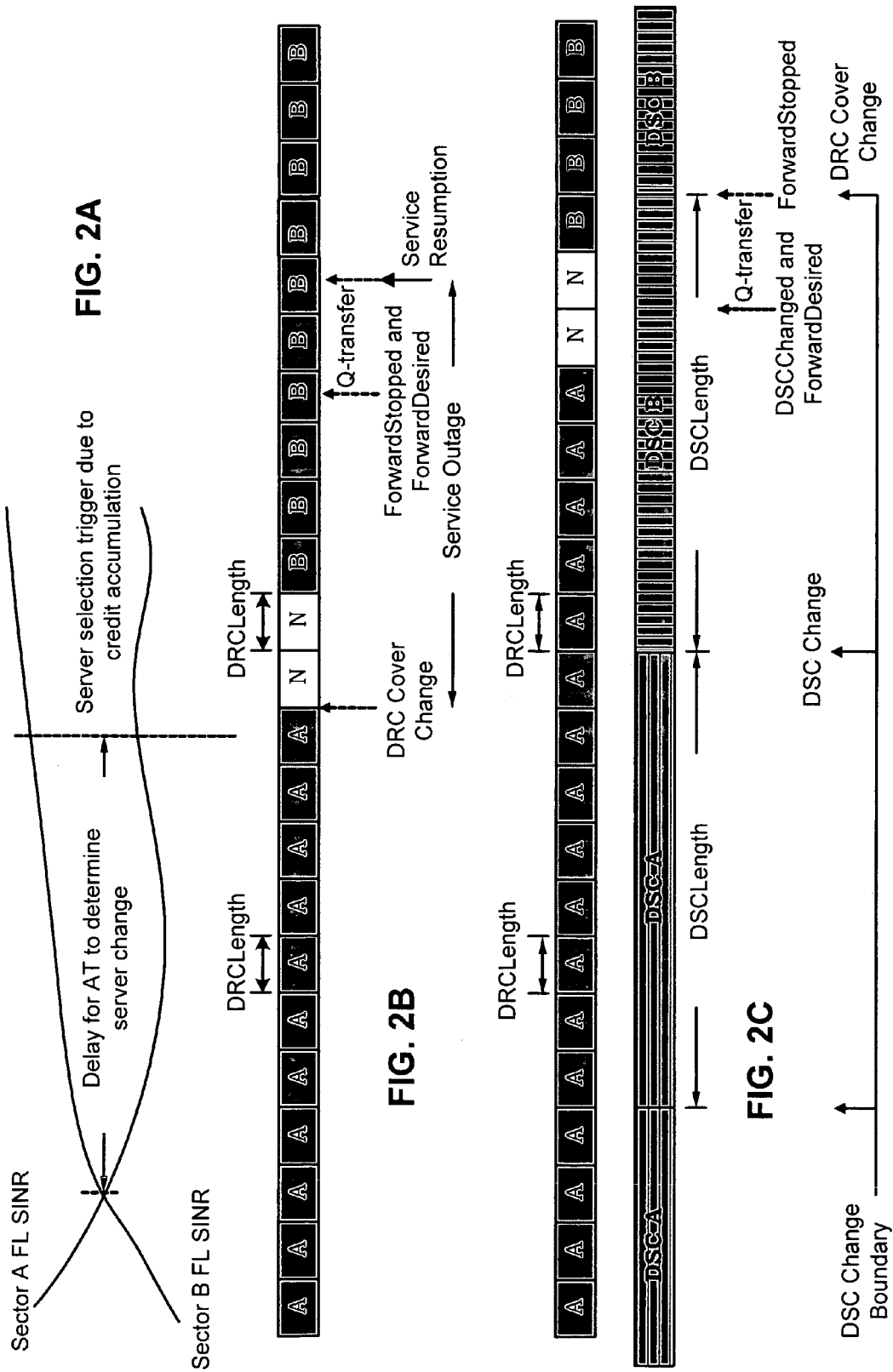
FIGS. 2A-2C illustrate embodiments of soft handoff timelines in "1xEV-DO Release 0" and "1xEV-DO Revision A" type systems.

FIGS. 2A-2C illustrate embodiments of soft handoff timelines in "1xEV-DO Release 0" and "1xEV-DO Revision A" type systems, relating to situations where an AT switches its forward link serving sector from a source sector (e.g., sector A) to a target sector (e.g., sector B). The trigger for the AT to switch its forward link serving sector may result from the forward link channel condition, e.g., the filtered signal-to-interference-and-noise (SINR) ratio (e.g., based on the pilot and/or other forward link signal measurements) from the target sector being consistently higher than that from the source sector according to a predetermined scheme, such as illustrated in FIG. 2A and further described below.

In a "1xEV-DO Release 0" type system, such as illustrated in FIG. 2B, an AT may use data rate control (DRC) channel to indicate to an AN the selected serving sector and the desired data rate associated with transmission on forward link. The DRC channel also provides for a feedback mechanism relating the channel quality information to the AN. The data portion and sector portion of DRC may be referred to herein as "DRC rate" and "DRC cover," respectively. The DRC rate and DRC cover constitutes a "DRC value."

The DRC cover may change at any DRC change boundary, e.g., in slot T such that $$(T+1-\text{FrameOffset}) \bmod DRC\text{Length}=0 \quad \text{Eq. (1)}$$

where FrameOffset may be measured in unit of slots, mod denotes a modular operation, and DRCLength may be a predetermined number of slots in duration (e.g., 8 slots). DRC cover and DRC rate may take effect half slot after the end of transmission and stays in effect for a number of slots equal to DRCLength.

For both soft and softer handoff, a minimum of two DRC lengths of null covers may be needed between different DRC covers (e.g., associated with switching from sector A to sector B), as the following examples illustrate.

1) If the AT's current DRC cover is a sector cover, then the AT's next DRC cover may not be a different sector cover. It may only be the same sector cover or a null cover.

2) If the AT's most recent sector cover corresponds to sector A, then the AT may not use a sector cover corresponding to sector B until the AT has determined that packets received from sector B will not overlap in time with packets received from sector A.

Consider a situation where an AT decides to switch its DRC from sector A to B at the end of slot n, which falls on a DRC change boundary. The DRC cover in effect on the medium access control (MAC) layer from slot (n+1) to slot (n+DRCLength) may still be sector A, and the AT may be scheduled for transmission by the AN during this time. As a result, the AT may not be able to change the DRC cover to sector B instantly. Thus, null cover needs to be transmitted from slot (n+1) to slot (n+DRCLength). The AN may schedule a packet to the AT at slot (n+DRCLength). If the packet is of a particular data rate (e.g., rate index 1 with 1024 bits over 16 slots), it may have a preamble of 1024 chips in length which is the time offset between the DRC change and the corresponding data packet transmission. The AT may not be sure that there is no packet for it when it determines the DRC cover for slot (n+DRCLength+1). Therefore, null cover needs to be transmitted from slot (n+DRCLength+1) to (n+2× DRCLength). As such, at least two null covers may be needed between the DRC cover changes.

If sector A and sector B are not in the same cell (e.g., in soft handoff), the ANC may need to forward data to sector B before it starts serving the AT. Upon detecting the DRC cover change, sector A may transmit a message (e.g., "Forward-Stopped") and sector B may also transmit a message (e.g., "ForwardDesired") to the ANC to indicate soft handoff, such as illustrated in FIG. 2B. Thus, the AT may not be served for at least one AP-ANC round trip time plus two DRClengths during soft handoff. For softer handoff, the non-service time may be at least two DRCLengths. The non-service time may be termed "service outage" (or "dark time") herein, such as illustrated in FIG. 2B. The service outage may pose a loss for delay-sensitive applications, such as "voice over Internet Protocol (VoIP)" data.

To reduce the service outage during handoff, a data source control (DSC) channel may be introduced (such as in a "1xEV-DO Revision A" type system), representing the serving cell or data source on forward link. An AT may use the DSC channel to indicate to an AN the selected serving cell on forward link, and use the DRC channel to indicate to the AN the selected serving sector on forward link. Examples of use of the DSC channel to facilitate the server selection in relation to AT and AN are described below.

FIGS. 2B and 2C illustrate a comparison of the soft handoff timelines in "1xEV-DO Release 0" and "1xEV-DO Revision A" type systems. For illustration and clarity, only the cases with minimum null DRC covers are explicitly shown. Note, for both soft handoff and softer handoff, if there are any on-going packets before DRC re-pointing, the AT may send null DRC covers until all of the packets are terminated. (This is the case in both "1xEV-DO Release 0" and "1xEV-DO Revision A" type systems.)

DSC may be configured to have predetermined boundaries, at which DSC is allowed to change. For example, DSC may change in slot T such that $$(T+1+15 \times \text{FrameOffset}) \bmod DSC\text{Length}=0 \quad \text{Eq. (2)}$$

Where DSCLength may be a predetermined number of slots in duration (e.g., 16 slots). As described above, DRC may change in slot T such that $$(T+1-\text{FrameOffset}) \bmod DRC\text{Length}=0 \quad \text{Eq. (3)}$$

DSC may take effect one slot after the end of transmission and stay in effect for DSCLength slots; whereas DRC may take effect half slot after the end of transmission and stays in effect for a number of slots equal to DRCLength.

DRC may conform with DSC. For example, if the DRC cover is a sector cover, the data source indicated by the DSC is included in the AT's active set and the DRCLock bit associated with the data source is set to "1", then the sector indicated by the DRC cover may belong to the data source indicated by the DSC that is in effect during the next DRCLength slots following transmission of the DRC.

DSC may be used as an early indication of handoff, thereby allowing the service outage associated with queue transfer (or "Q-transfer") between AP and ANC to be minimized, or substantially eliminated. In an embodiment, a plurality of APs in the AT's active set may attempt to detect DSC ahead of DSC length boundary (e.g., on a per-slot basis). When any sector reports possible changes of DSC, the ANC may start multicasting data associated with expedited flow (EF) applications (e.g., delay-sensitive data, such as VoIP packets) to some or all of the sectors in the AT's active set. Examples of the multicast mechanism are further described below. Multicast allows sector B to be ready to serve when the DRC cover starts to point at it.

A minimum of two DR lengths of null cover may also be needed in a "1xEV-DO Revision A" type system for both soft and softer handoff. As such, the service outage for EF data in soft handoff may be reduced to two DRCLengths of null cover. For softer handoff, it may remain at two DRCLengths of null cover. The difference between soft handoff and softer handoff in such systems may be that the latter happens at any DRC change boundary.

Figure 3:
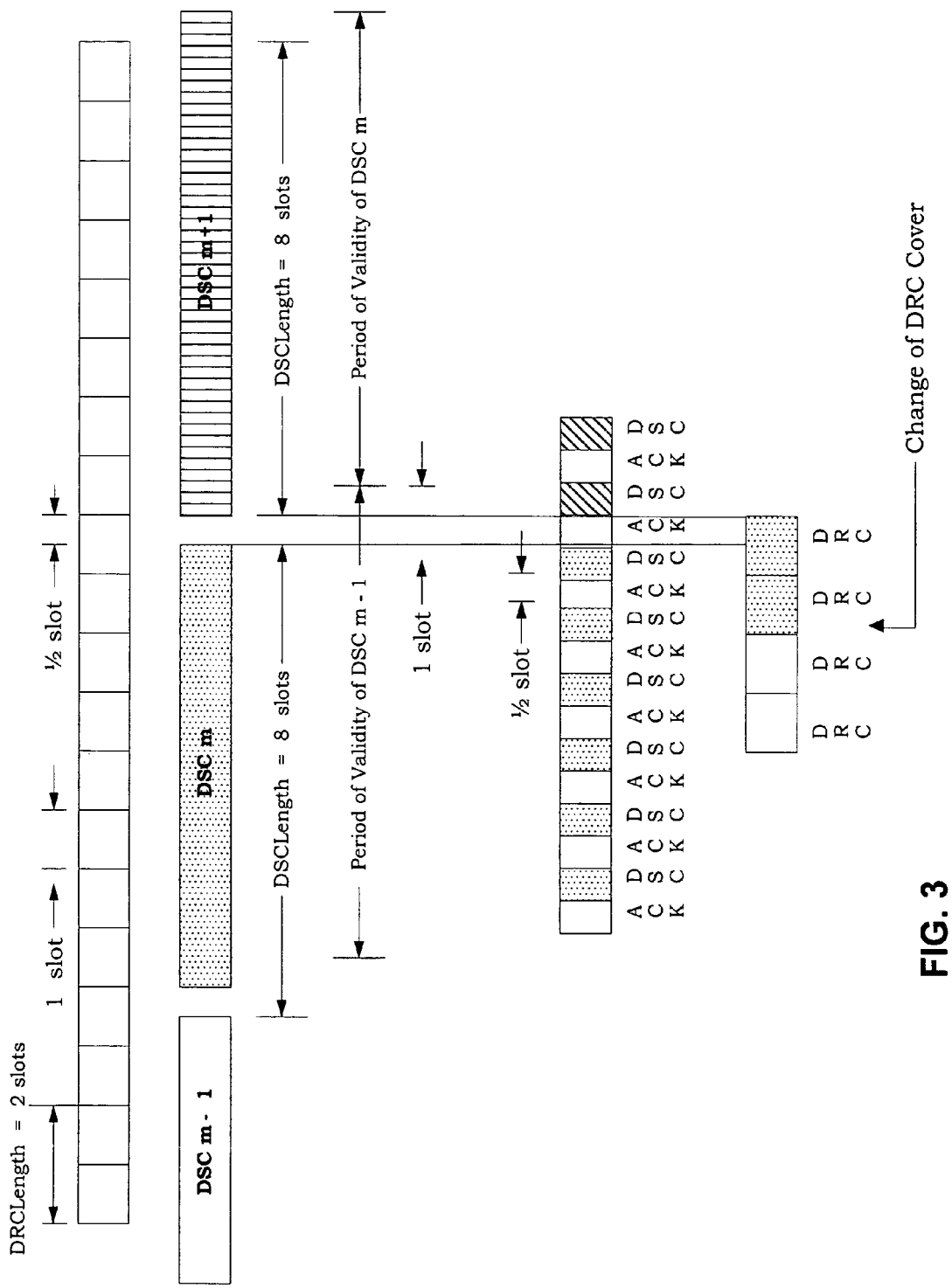
FIG. 3 illustrates an embodiment of operating timelines of DSC and DRC channels.

By way of example, FIG. 3 illustrates an embodiment of the DSC channel timeline for a DRCLength of two slots and a DSCLength of eight slots.

Figure 4:
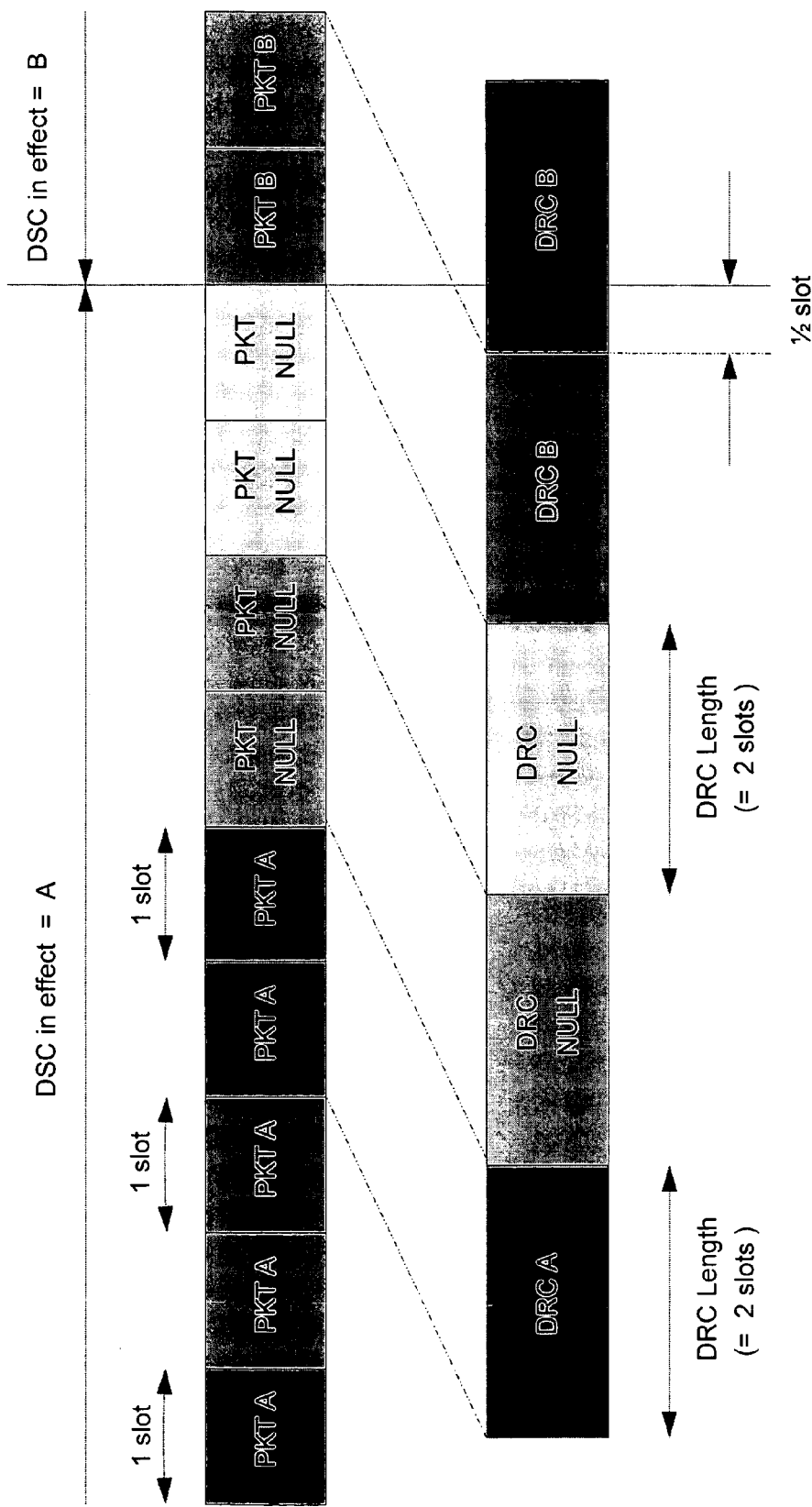
FIG. 4 illustrates an embodiment of DRC cover change.

FIG. 4 illustrates an embodiment of DRC cover change. DRC A and DRC B denote DRC covers associated with cell A and cell B, respectively. DRC NULL indicates a DRC with null cover. PKT A or PKT B indicate potential start of a new packet from cell A or cell B. PKT NULL indicates no new packet because of null-covered DRC.

In some embodiments, to avoid severe long-term imbalance, DSC may not point at a cell with weak reverse link. For example, if an AT receives a DRCLock bit that is set to "0" from a sector in its active set, the AT may not point its DSC to the data source associated with that sector (e.g., to avoid AT initiating a soft handoff).

During soft handoff, DSC/DRC repointing may be delayed, e.g., up to two DSCLengths in the worst case. As a result, a short DSCLength may be desirable to reduce the delay and possible service degradation due to bad channel conditions. On the other hand, higher transmit power may be needed to maintain the DSC channel reliability in such cases. Thus, the additional overhead needs to be evaluated against the benefit of shorter delay.

DSC/DRC repointing may be initiated by the AT, e.g., based on the filtered forward link SINR measurements from different sectors. A first-order infinite impulse response (IIR) filter may be used (e.g., with a time constant of 64 slots). Let sector A be the current serving sector and sector B as another sector in the AT's active set. A parameter, termed "credit" herein and denoted by $C_B$, may be maintained for sector B and updated as follows:

$$C_B(n+1) = \max(0, C_B(n) + \Delta(n)) \quad \text{Eq. (4)}$$

where $$\Delta(n) = \begin{cases} 1, & \text{if } SINR_B(n) - SINR_A(n) > X; \\ -1, & \text{if } SINR_B(n) - SINR_A(n) < Y; \\ 0, & \text{otherwise.} \end{cases} \quad \text{Eq. (5)}$$

In the above, $SINR_A(n)$ and $SINR_B(n)$ denote the filtered pilot SINR measurements for sector A and sector B, respectively, and n denotes a time index. X and Y may be predetermined thresholds (e.g., measured in dB). There may be two handoff parameters, termed "SofterHandoffDelay" and "SoftHandoffDelay" herein, associated with the minimum interruption/delay times when the AT switches its DRC from a source sector to a target sector belonging to the same and a different cell, respectively. In some embodiments, the values of such handoff parameters may be in units of slots (e.g., 8 slots). For example, SofterHandoffDelay=8 slots and SoftHandoffDelay=64 slots may be used (e.g., in either "1xEV-DO Release 0" or "1xEV-DO Revision A" type system). These parameters may for example be used in thresholding the accumulated credit.

In a "1xEV-DO Release 0" type system, for both soft and softer handoff, the number of credits needed for repointing may be equal to SoftHandoffDelay. Because handoff would cause the service outage, a large threshold on the credits may limit the frequency at which an AT initiates handoff.

In a "1xEV-DO Revision A" type system, due to the reduction in service outage, smaller thresholds may be used. For example:
  If an AT is in softer-only handoff (e.g., all members of its active set belonging to the same cell), the threshold on the credit may be given by max(1, SofterHandoffDelay-DRCLength);
  Otherwise, the threshold may be given by max(1, SoftHandoffDelay-DSCLength).

Note, the threshold may be determined by the composition of the AT's active set (as opposed to at which sector the AT is going to repoint). The credit may be computed at the DRC change boundary for softer repointing and at the DSC boundary for soft repointing. To avoid frequent DSC/DRC repointing, a timer may be set when soft/softer repointing happens, such that the AT may not initiate another repointing before the timer expires. In some embodiments, the timer expiration period may be equal to SofterHandoffDelay and SoftHandoffDelay, respectively. (As such, SofterHandoffDelay and SoftHandoffDelay may indicate the cost of softer and soft handoff.)

In a "1xEV-DO Release 0" type system, there may be two messages from AP to ANC related to sector repointing: e.g., a message termed "ForwardStopped" herein from sector A and another message termed "ForwardDesired" herein from sector B. These messages are processed by ANC to execute Q-transfer from sector A to sector B, and the service outage is associated with this Q-transfer (such as illustrated in FIG. 2B). In a "1xEV-DO Revision A" type system, continuous data service (e.g., EF data/flows) may be made possible by use of the DSC channel. Such may be carried out by decoding the DSC channel ahead of the DSC change boundary and letting ANC multicast data to some or all sectors in the AT's active set between the early detection and the final detection at the DSC boundary. In some situations, multicast may be applied only to EF applications (e.g., delay-sensitive data, such as VoIP data), so as to limit the impact on backhaul traffic.

In an embodiment, each sector in the AT's active set may attempt to decode the DSC channel. The final decision is made at the DSC boundary, denoted as $T_d$ herein. At $T_d$, the DSC value with the maximum accumulated energy may be declared as the DSC in effect for the next DSCLength, if the accumulated energy is larger than a threshold; otherwise, a DSC erasure may be declared.

To facilitate the Q-transfer and limit multi-slot packet around $T_d$, an early decision may be desirable. For example, each AP may provide a DSC decoding decision at time $T_{pd}$, which proceeds $T_d$ by a predetermined (e.g., system-wide configured) number of slots (e.g., 12 slots). The same energy threshold may be used as in the final decision at $T_d$. There may be situations where these early detections are not as reliable as the final decision; such may be compensated, however, by the multicast nature of data transmission between $T_{pd}$ and $T_d$.

The following terms may be used in situations involving multicast between ANC and APs (e.g., those in the AT's active set):

Serving AP: An AP that has advertised a message (e.g., ForwardDesiredInd) to ANC, and is considered as the serving AP until it has advertised another message (e.g., ForwardStoppedInd) to ANC. (A serving sector may refer to a sector serviced by the serving AP.)

Active serving AP: An AP that has advertised a ForwardDesiredInd message to ANC, and is considered by ANC to be serving data to the AT.

Non-serving AP: An AP that has advertised a ForwardStoppedInd message to ANC, and is considered as a non-serving AP until it has advertised a ForwardDesiredInd message to ANC. (A non-serving sector may refer to a sector serviced by the non-serving AP.)

In addition to ForwardStoppedInd and ForwardDesiredInd messages, a new message, termed "DSCChangedInd" herein, may be used by an AP to indicate to ANC the change in the decoded value associated with the DSC channel. This indication may be issued by any serving AP in the AT's active set and indicates one of the following:

A DSC value, indicating the identity of the AP which the AT intends to handoff to. In this case, the DSC change time may also be provided, indicating the time at which the indicated DSC value may take effect.

An erasure, indicating that the AP was unable to decode the DSC channel successfully.

The handoff messages may be generated under the following conditions, and are also illustrated in Table 1 below:

ForwardDesiredInd: The AP has successfully decoded the DSC channel received from the AT and the decoded DSC value is the same as its own (or self) DSC value. This may be generated at $T_{pd}$ and $T_d$.

DSCChangedInd(Erased): The AP is unable to decode the DSC channel received from the AT. This may be generated at $T_{pd}$ and $T_d$.

DSCChangedInd(Changed): The AP has successfully decoded the DSC channel received from the AT and the decoded DSC value is different from its own DSC value. This may be generated at $T_{pd}$.

ForwardStoppedInd: This is generated when the AP has successfully determined that the DSC value is not the same as its own DSC value for a configurable number of slots. This may be generated at $T_d$.

Table 1 below illustrates combinations of messages and time instants during handoff.

TABLE 1

| Handoff Message-Time Instant Combinations | | |
|---|---|---|
| Message | $T_{pd}$ | $T_d$ |
| DSCChangedInd(Erased) | Serving AP | Serving AP |
| DSCChangedInd(Changed) | Serving AP | |
| ForwardStoppedInd | | Serving AP |
| ForwardDesiredInd | Serving/Non-Serving AP | Serving/Non-Serving AP |

In some situations, various handoff messages may be received in any order at ANC except for the following: DSCChangedInd may not immediately follow ForwardStoppedInd.

ANC may enter into the multicast state upon receipt of one of the following events:

DSCChangedInd from the active serving AP. The receipt of DSCChangedInd indicates that the state of the DSC channel has changed. Such may imply that either the DSC channel decoding is successful and DSC is pointing to another AP, or the DSC channel decoding is unsuccessful.

ForwardStoppedInd from a serving AP that leads to no serving AP in the AT's active set.

ANC may exit the multicast state if there is only one serving AP in the AT's active set and it has not reported any DSC change.

In the event that the original serving sector drops out of the AT's active set, it may send a ForwardStoppedInd message to ANC, and the multicast mechanism may handle this situation normally. In some embodiments, data between ANC and AP may be transmitted using user datagram protocol (UDP), while the signaling messages may be transmitted using transmission control protocol (TCP) for reliability.

Figure 5:
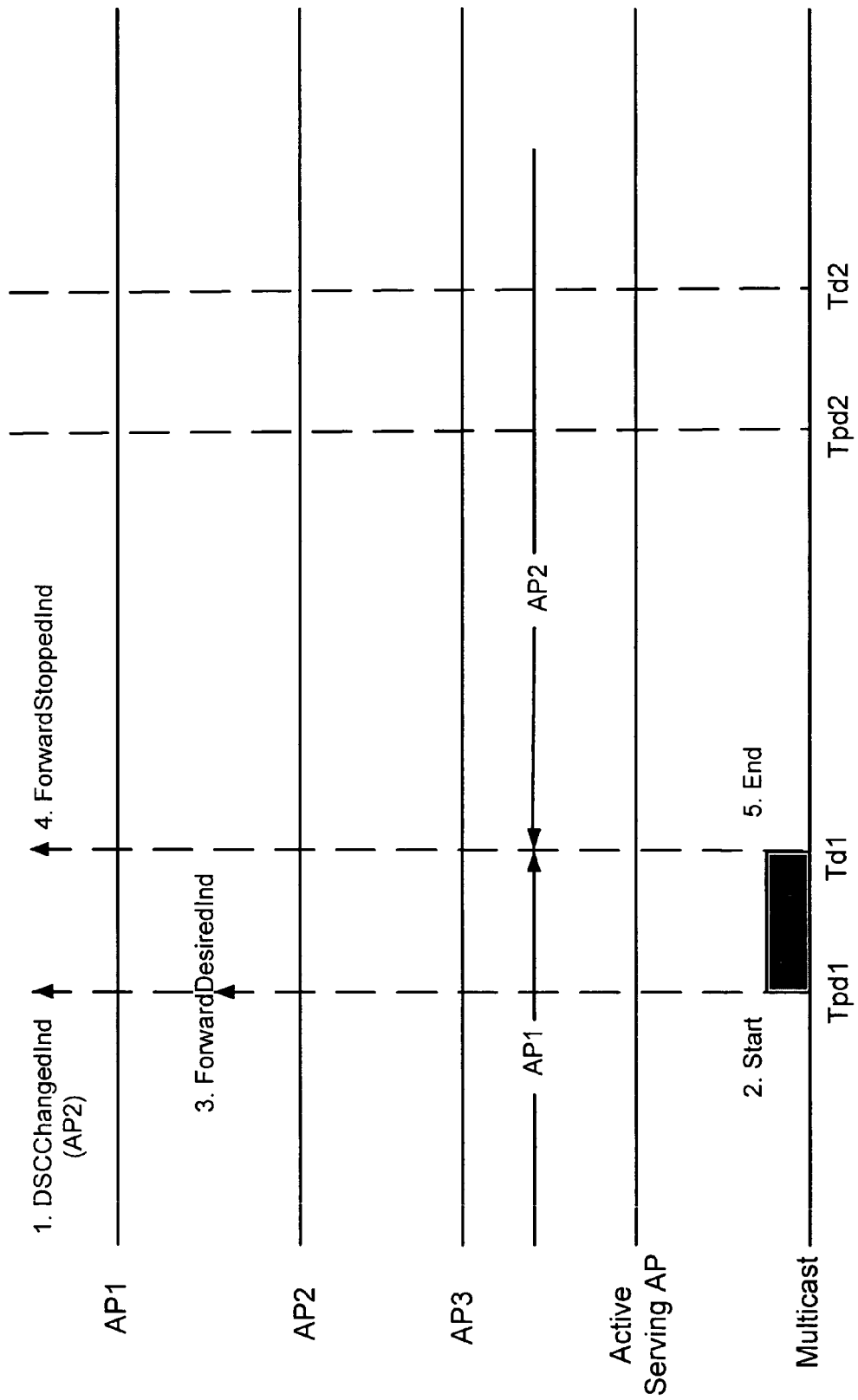
FIG. 5 illustrates an embodiment of a sequence of events taking place in a first soft handoff scenario.

FIG. 5 illustrates an embodiment of a sequence of events taking place in a first soft handoff scenario, where both the active serving AP (or "AP1" for simplicity) and a non-serving AP (or "AP2" for simplicity) are able to correctly detect the DSC change. At various steps illustrated in FIG. 5:

1. AP1 decodes the DSC channel and determines that the AT is no longer pointing its DSC to AP1. AP1 subsequently sends a DSCChangedInd message to ANC, which may include the new DSC value, the current queue level, the predicted switch time, etc.
2. ANC enters into the multicast state, e.g., starting to multicast forward traffic (e.g., EF data) to all APs in the AT's active set.
3. AP2 successfully decodes the DSC channel at time $T_{pd1}$, and sends a ForwardDesiredInd message to ANC.
4. At time $T_{d1}$, AP1 concludes that the AT is switching to AP2, and sends a ForwardStoppedInd message to ANC.
5. ANC sets the active serving AP for the AT to be AP2, stops multicasting and starts to send forward traffic to AP2 only.

Figure 6:
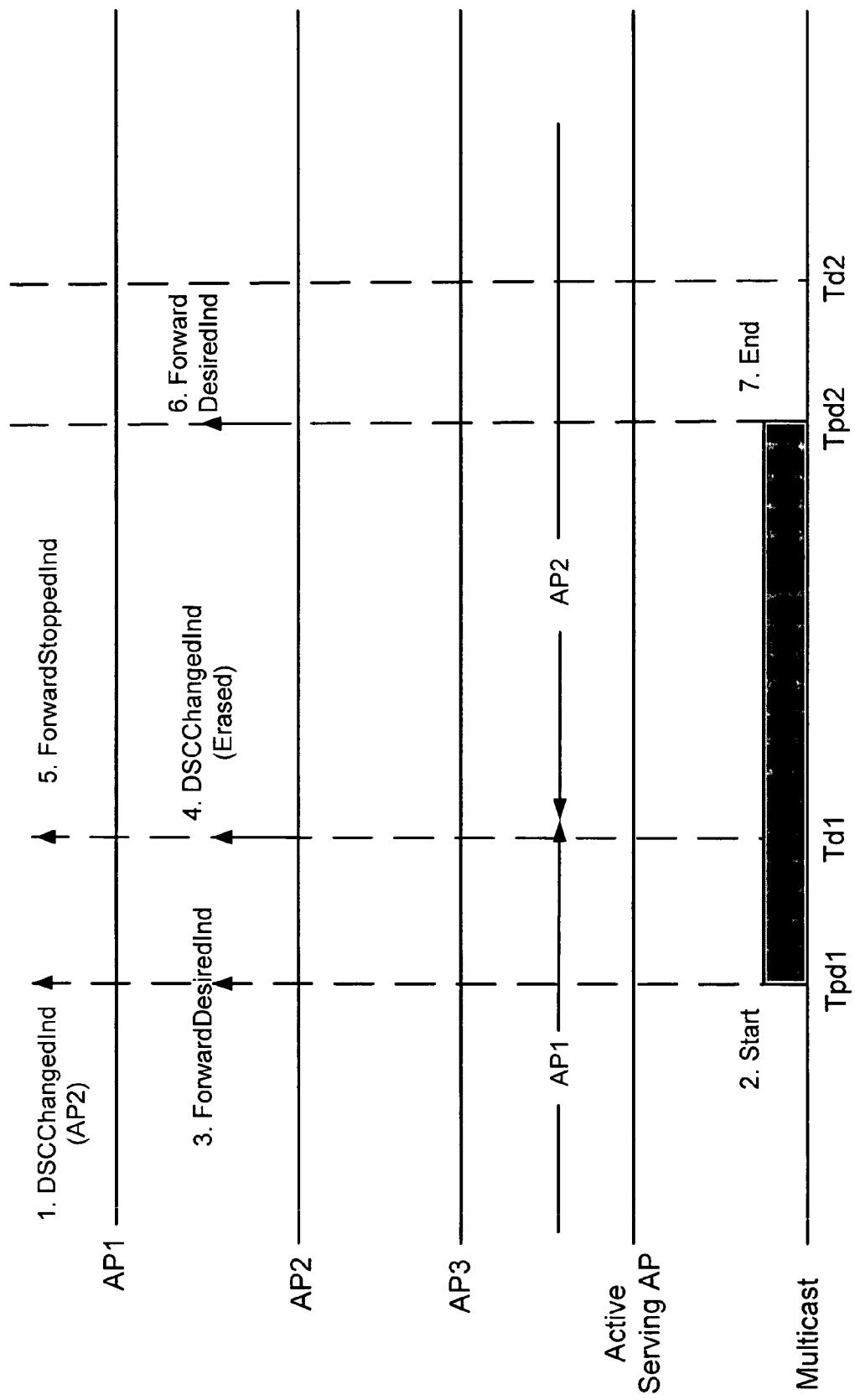
FIG. 6 illustrates an embodiment of a sequence of events taking place in a second soft handoff scenario.

FIG. 6 illustrates an embodiment of a sequence of events taking place in a second soft handoff scenario, where the active serving AP (or "AP1) is able to correctly detect the DSC change and a non-serving AP (or "AP2") detects a DSC erasure. At various steps illustrated in FIG. 6:

1. AP1 decodes the DSC channel and determines that the AT is no longer pointing its DSC at AP1. AP1 subsequently sends a DSCChangedInd message to ANC, which may include the new DSC value, the current queue level, the predicted switch time, etc.
2. ANC enters into the multicast state, e.g., starting to multicast forward traffic to all APs in the AT's active set.
3. AP2 successfully decodes the DSC channel (which is pointing to itself), and sends a ForwardDesiredInd message to ANC.
4. AP2 decodes a DSC erasure, and sends a DSCChangedInd message to ANC.
5. At time $T_{d1}$, AP1 concludes that the AT is switching to AP2, and sends a ForwardStoppedInd message to ANC. ANC sets the active serving AP for the AT to be AP2.
6. AP2 successfully decodes more DSC symbols (which are the same as its own value). Because AP2 has just sent a DSCChangedInd message to ANC, it sends another ForwardDesiredInd message to confirm with ANC that the AT is in fact switching to AP2.
7. ANC stops multicasting and starts to send forward traffic to AP2 only.

Figure 7:
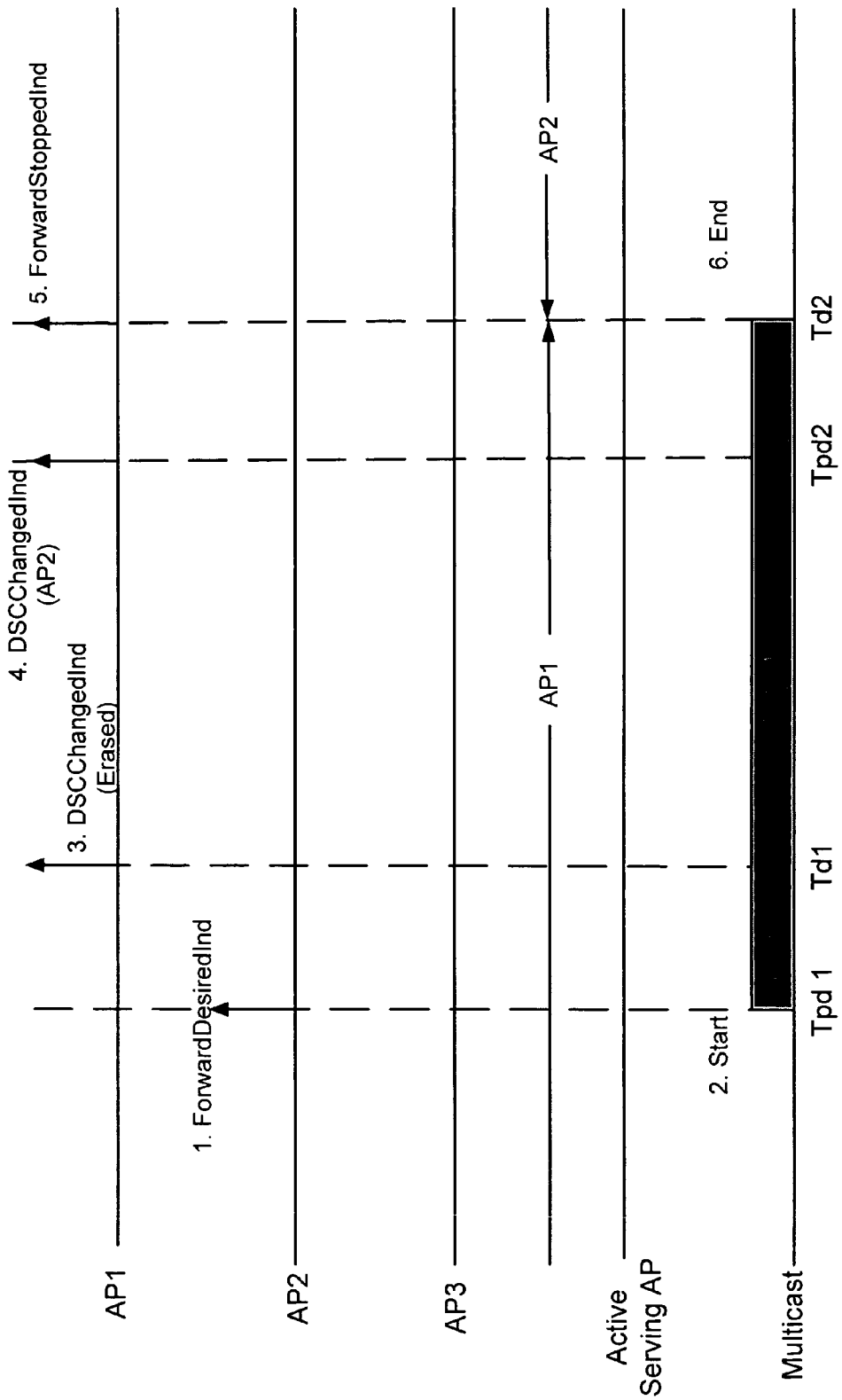
FIG. 7 illustrates an embodiment of a sequence of events taking place in a third soft handoff scenario.

FIG. 7 illustrates an embodiment of a sequence of events taking place in a third soft handoff scenario, where the active serving AP (or "AP1") detects the DSC change after a DSC erasure and a non-serving AP (or "AP2") is able to correctly detect the DSC change. At various steps illustrated in FIG. 7:
1. AP2 successfully decodes the DSC channel (which is the same as its own value), and sends a ForwardDesiredInd message to ANC.
2. ANC enters into the multicast state, e.g., starting to multicast forward traffic to all APs in the AT's active set.
3. At time $T_{d1}$, AP1 decodes a DSC erasure, and sends a DSCChangedInd message to ANC.
4. AP1 decodes the DSC channel (which is pointing to a different AP), and sends a DSCChangedInd message to ANC.
5. At time $T_{d2}$, AP1 concludes that the AT is switching to AP2, and sends a ForwardStoppedInd message to ANC. ANC sets the active serving AP for the AT to be AP2.
6. ANC stops multicasting and starts to send forward traffic to AP2 only.

Figure 8:
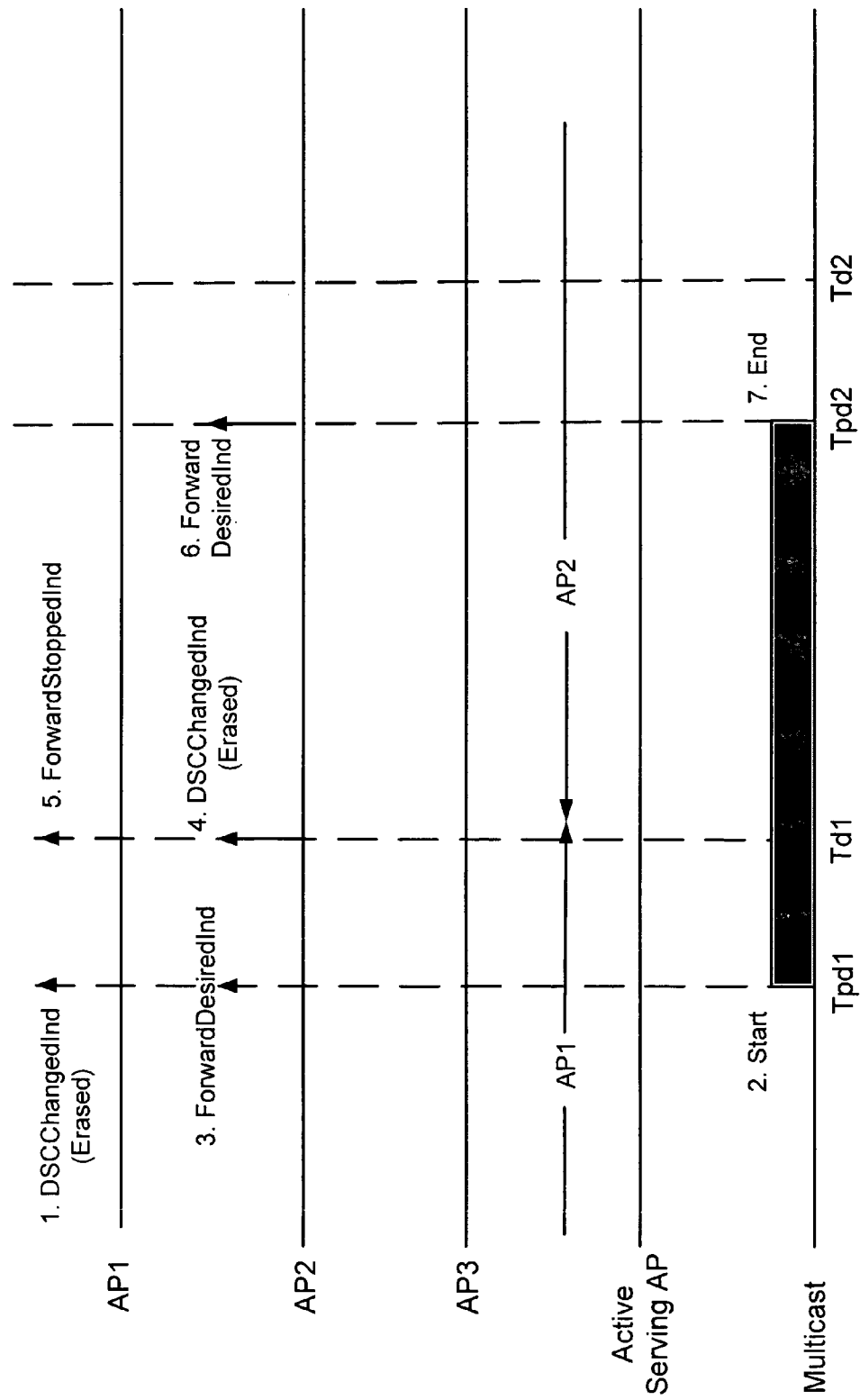
FIG. 8 illustrates an embodiment of a sequence of events taking place in a fourth soft handoff scenario.

FIG. 8 illustrates an embodiment of a sequence of events taking place in a fourth soft handoff scenario, where the active serving AP (or "AP1") recovers from a DSC erasure and a non-serving AP (or "AP2") recovers from a DSC erasure. At various steps illustrated in FIG. 8:
1. AP1 decodes a DSC erasure, and sends a DSCChangedInd message to ANC.
2. ANC enters into the multicast state, e.g., starting to multicast forward traffic to all APs in the AT's active set.
3. AP2 successfully decodes the DSC (which is pointing to itself), and sends a ForwardDesiredInd message to ANC.
4. AP2 decodes a DSC erasure, and sends a DSCChangedInd message to ANC.
5. At time $T_{d1}$, AP1 concludes that the AT is switching to AP2, and sends a ForwardStoppedInd message to ANC. ANC sets the active serving AP for the AT to be AP2.
6. AP2 successfully decodes more DSC symbols (which are the same as its own value). Because AP2 has just sent a DSCChangedInd message to ANC, it sends another ForwardDesiredInd message to confirm with ANC that AT is in fact switching to AP2.
7. ANC stops multicasting and starts to send forward traffic to AP2 only.

There are other handoff scenarios and implementations. For example, in some embodiments, ANC may multicast forward traffic (e.g., EF data) to a subset of the APs in the AT's active set in the multicast state. As illustrated above, use of multicast may compensate for the DSC erasure or error at a serving or non-serving sector.

In the event that the active serving AP makes a wrong DSC detection and still thinks the DSC pointing to itself, a DSC-ChangedInd message may not be sent. Consequently, the multicast state may not start at $T_{pd}$ or $T_d$, even if another AP sends a ForwardDesiredInd message. In other words, the multicast state may start only after a DSCChangedInd message is sent from the active serving sector.

In some embodiments, when an AP sends a DSCChangedInd or ForwardStoppedInd message to ANC, it may also send its queue information. For example, the message may indicate the last byte which has been sent.

In some embodiments, at the end of the multicast state, ANC may send out commands to every AP that is no longer considered as a serving sector, e.g., to flush their respective data queues. These commands, along with the opening and the closing of the flow, mark the transmission period. ANC may associate each packet it sends out with a tag number that changes incrementally (e.g., by a unit of "1") for each transmission period. Such may be useful in uniquely identifying packets at an AP.

Figure 9:
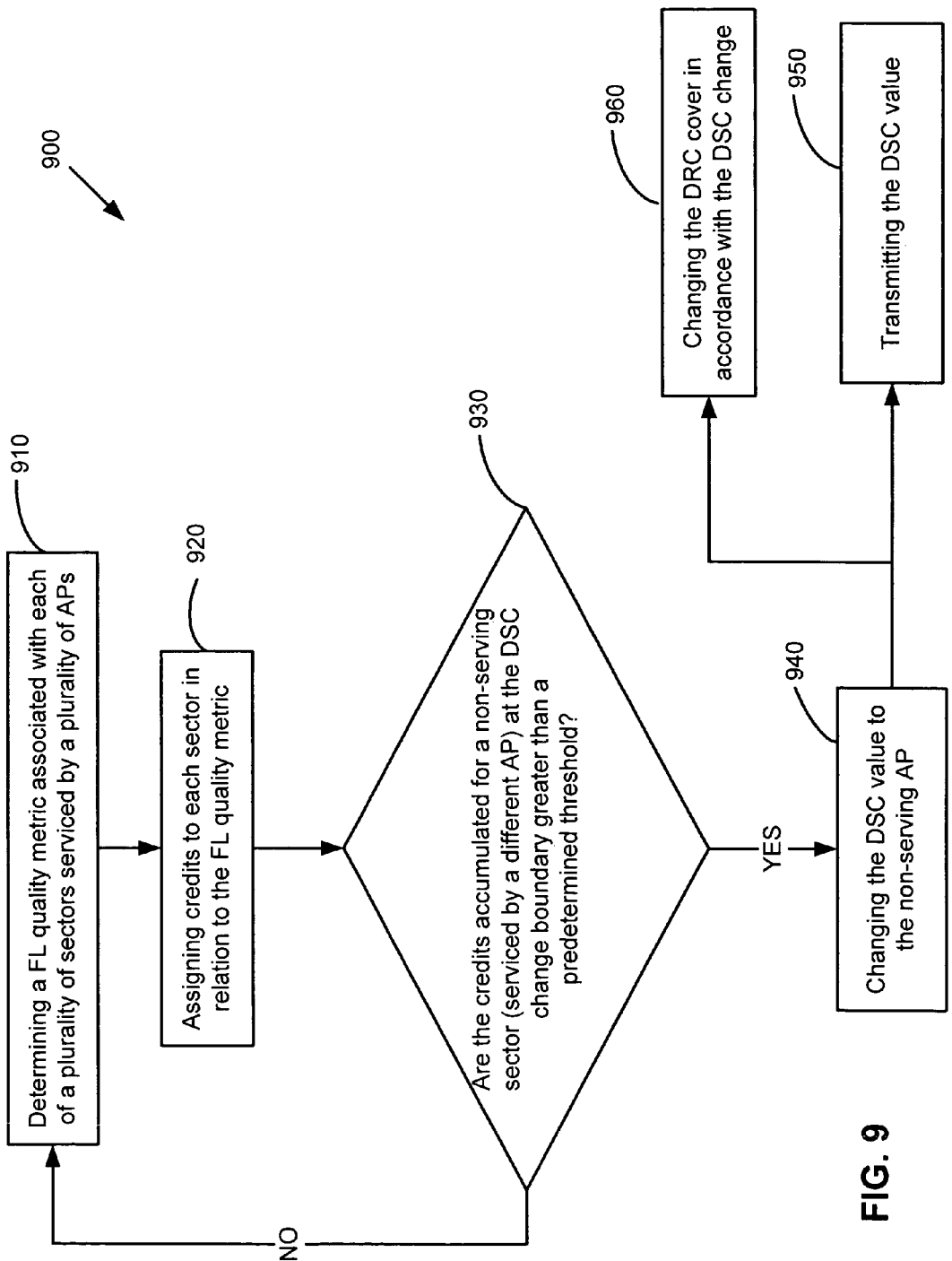
FIG. 9 illustrates a flow chart of a process, which may be used to implement some disclosed embodiments.

FIG. 9 illustrates a flow chart of a process 900, which may be used to implement some disclosed embodiments (such as described above). Step 910 determines a forward link (FL) quality metric associated with each of a plurality sectors serviced by a plurality of APs (e.g., in the active set of an AT). Step 920 assigns credits top each sector in relation to the FL quality metric as determined. Step 930 determines if the credits accumulated for a non-serving sector at the DSC change boundary are greater than a predetermined threshold, where the non-serving sector is serviced by a non-serving AP different from a serving AP for the AT. If the outcome of step 930 is "YES," step 940 follows and changes the DSC value from the serving AP to the non-serving AP. Step 950 transmits the DSC value to the plurality of APs. Step 960 changes the DRC cover in accordance with the DSC change (e.g., repointing the DRC cover to the non-serving cover). If the outcome of step 930 is "NO," process 900 returns to step 910.

Figure 10:
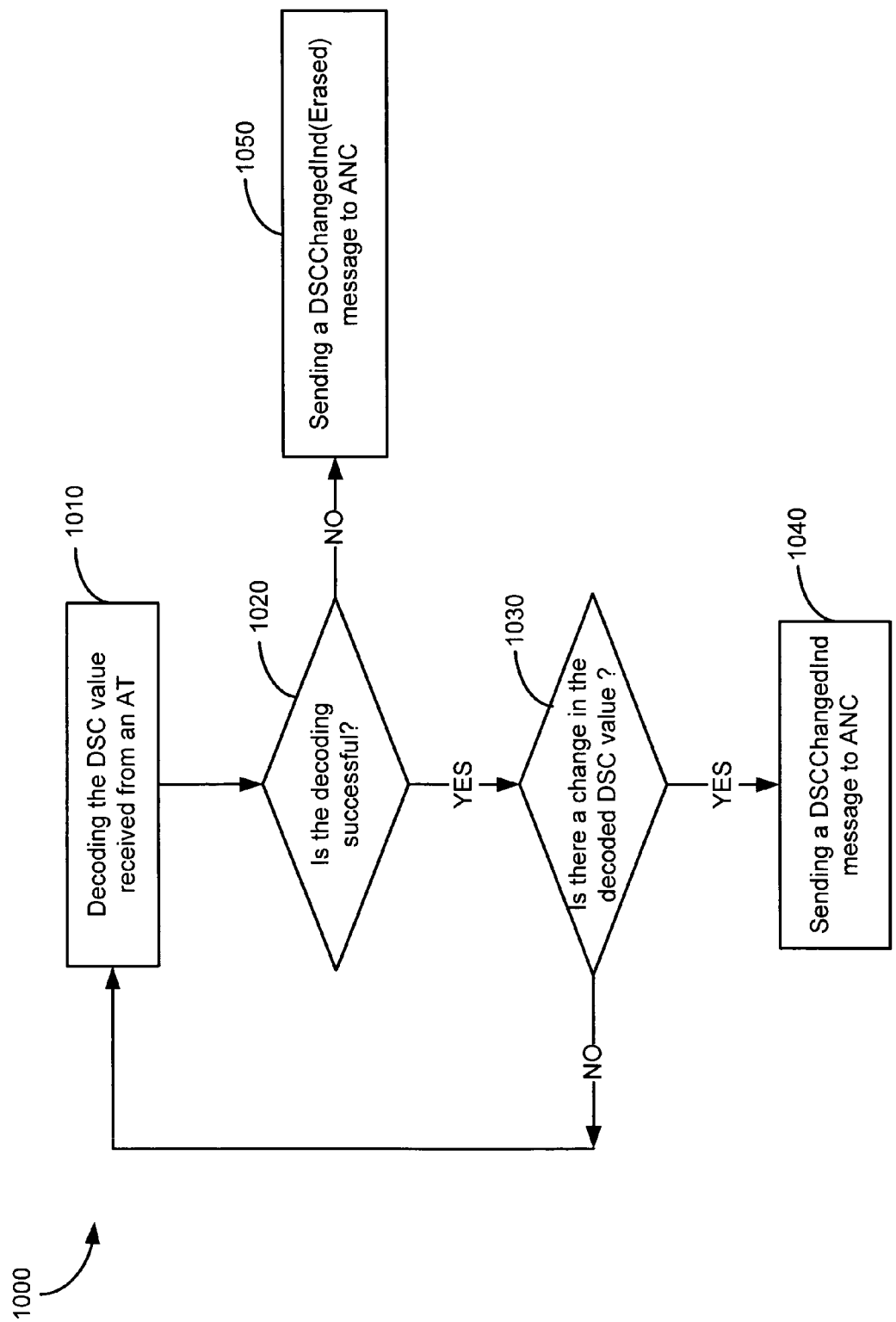
FIG. 10 illustrates a flow chart of a process, which may be used to implement some disclosed embodiments.

FIG. 10 illustrates a flow chart of a process 1000, which may be used to implement some disclosed embodiments (such as described above). Step 1010 decodes the DSC value received from an AT (such as described in the embodiment of FIG. 9). Step 1020 determines if the decoding is successful. If the outcome of step 1020 is "YES," step 1030 determines if there is a change in the decoded DSC value. If the outcome of step 1030 is "YES," step 1040 follows and sends a DSC-ChangedInd message to an ANC. If the outcome of step 1030 is "NO," process 1000 returns to step 1010. If the outcome of step 1020 is "NO," step 1050 follows and sends a DSC-ChangedInd(Erased) message to the ANC.

Figure 11:
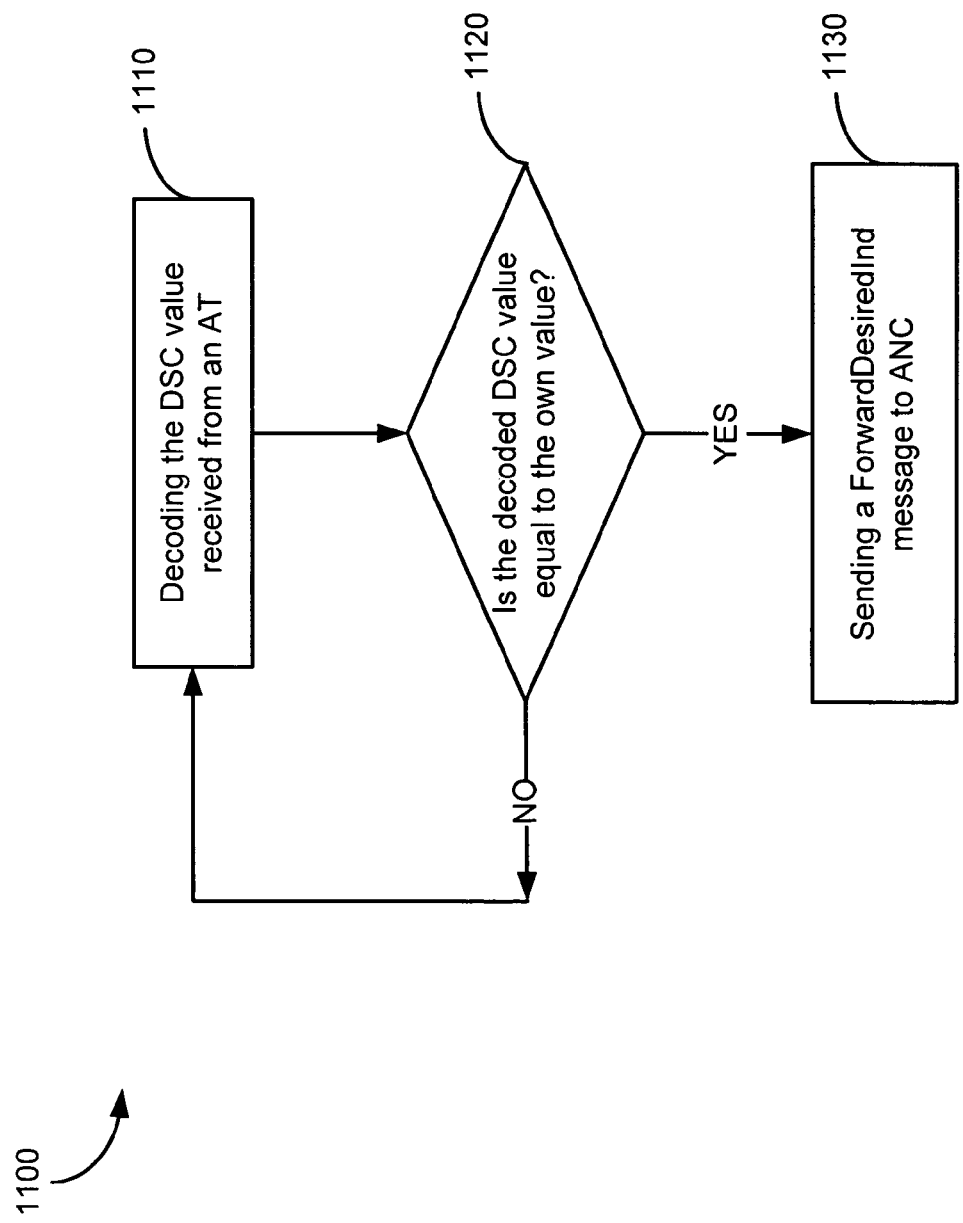
FIG. 11 illustrates a flow chart of a process, which may be used to implement some disclosed embodiments.

FIG. 11 illustrates a flow chart of a process 1100, which may be used to implement some disclosed embodiments (such as described above). Step 1110 decodes the DSC value received from an AT (such as described in the embodiment of FIG. 9). Step 1120 determines if the decoded DSC value is equal to the own value (e.g., that of a non-serving AP). If the outcome of step 1120 is "YES," step 1130 follows and sends a ForwardDesiredInd message to an ANC. If the outcome of step 1120 is "NO," process 1100 returns to step 1110.

Figure 12:
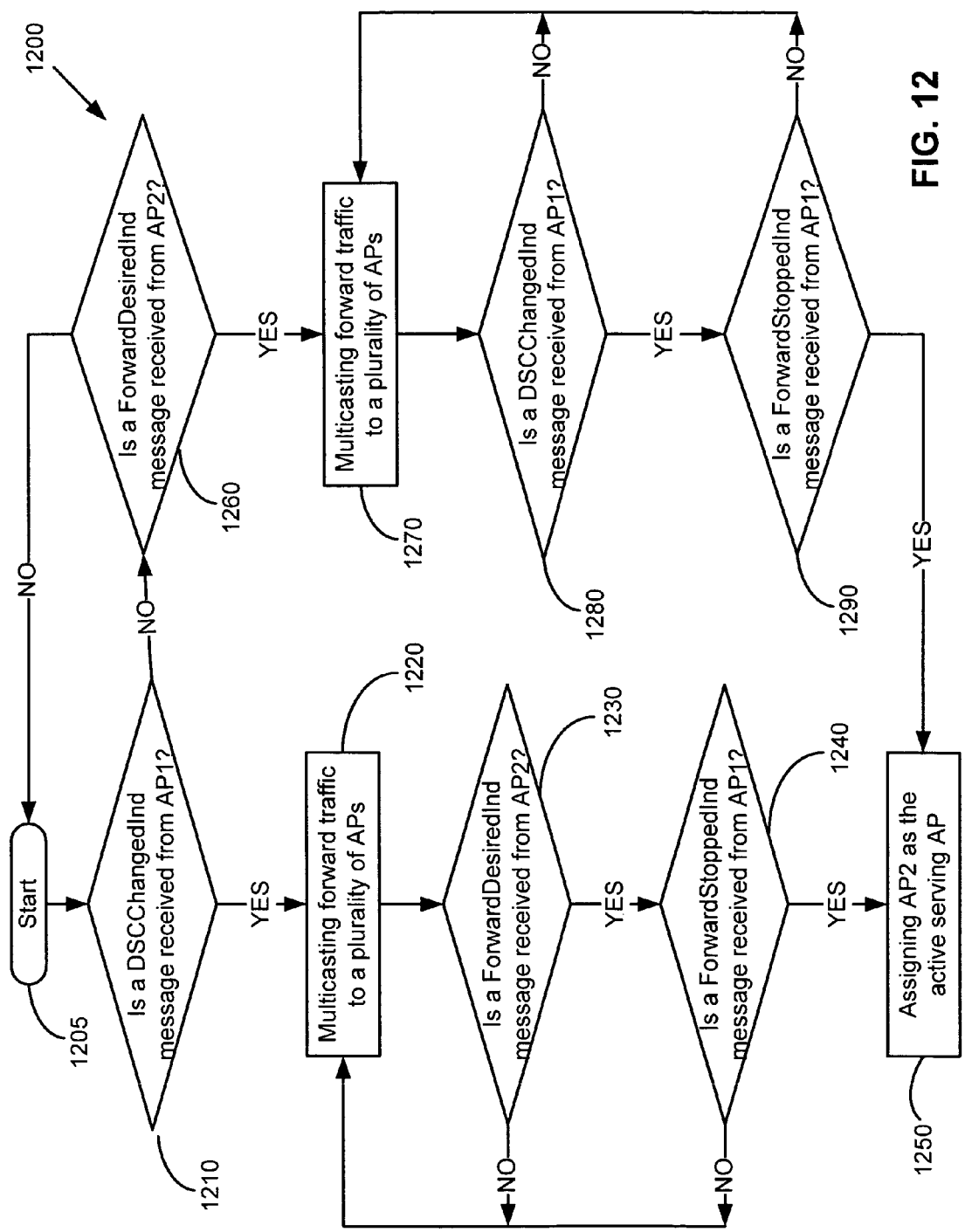
FIG. 12 illustrates a flow chart of a process, which may be used to implement some disclosed embodiments.

FIG. 12 illustrates a flow chart of a process 1200, which may be used to implement some disclosed embodiments (such as described above). Process 1200 starts at step 1205. Step 1210 determines if a DSCChangedInd message has been received from a serving AP (e.g., AP1 described above). If the outcome of step 1210 is "YES," step 1220 follows and starts multicasting forward traffic (e.g., EF data) associated with an AT to a plurality of APs (e.g., those in the AT's active set). Step 1230 determines if a ForwardDesiredInd message has been received from a non-serving AP (e.g., AP2 described above). Step 1240 determines if a ForwardStoppedInd message has been received from AP1. If the outcomes of both steps 1230 and 1240 are "YES," step 1250 follows and assigns AP2 to be the active serving AP for the AT. If the outcome of either step 1230 or step 1240 is "NO," process 1200 returns to step 1220.

In FIG. 12, if the outcome of step 1210 is "NO," step 1260 follows and determines if a ForwardDesiredInd message has been received from a non-serving AP (e.g., AP2 described above). If the outcome of step 1260 is "YES," step 1270 follows and starts multicasting forward traffic (e.g., EF data) associated with the AT to a plurality of APs (e.g., those in the AT's active set). Step 1280 determines if a DSCChangedInd message has been received from a serving AP (e.g., AP1 described above). Step 1290 determines if a ForwardStoppedInd message has been received from AP1. If the outcomes of both steps 1280 and 1290 are "YES," process 1200 proceeds to step 1250. If the outcome of either step 1280 or step 1290 is "NO," process 1200 returns to step 1270. If the outcome of step 1260 is "NO," process 1200 returns to step 1205.

Figure 13:
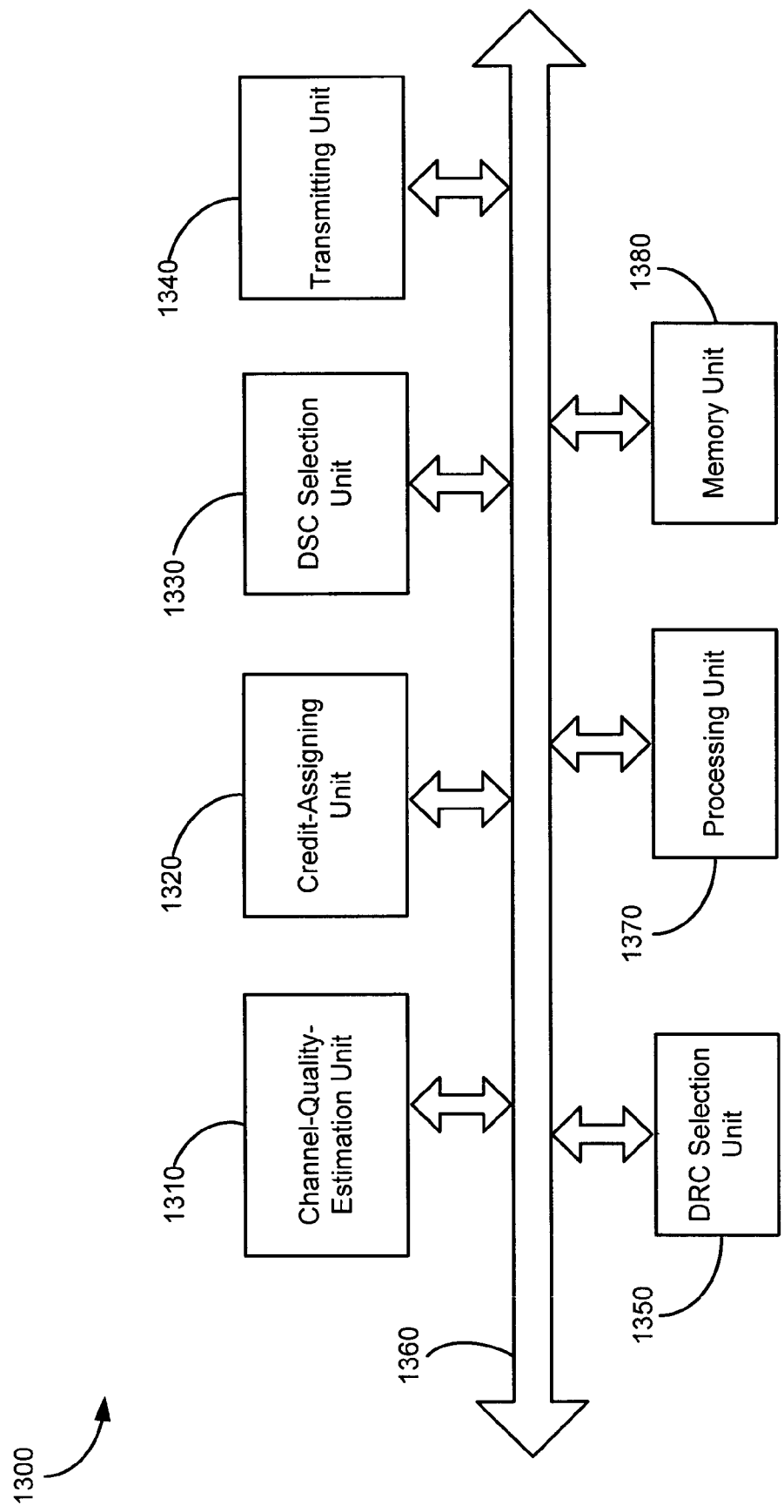
FIG. 13 illustrates a block diagram of an apparatus, in which some disclosed embodiments may be implemented.

FIG. 13 illustrates a block diagram of an apparatus 1300, in which some disclosed embodiments (such as described above) may be implemented. By way of example, apparatus 1300 may include a channel-quality-estimation unit (or module) 1310 configured to determine a forward link quality metric associated with each of a plurality of sectors serviced by the plurality of APs (e.g., those in the active set of an AT); a credit-assigning unit 1320 configured to assign credits to each sector in relation to the FL quality metric; a DSC selection unit 1330 configured to select/change a DSC value for the AT (e.g., if the credits accumulated for a non-serving sector at the DSC change boundary are greater than a predetermined threshold); a transmitting unit 1340 configured to transmit the DSC value to the plurality of APs; and a DRC selection unit 1350 configured to select/change the DRC cover in accordance with the DSC change.

In apparatus 1300, channel-quality-estimation unit 1310, credit-assigning unit 1320, DSC selection unit 1330, transmitting unit 1340, and DRC selection unit 1350 may be coupled to a communication bus 1360. A processing unit 1370 and a memory unit 1380 may also be coupled to communication bus 1360. Processing unit 1370 may be configured to control and/or coordinate the operations of various units. Memory unit 1380 may embody instructions to be executed by processing unit 1370.

Apparatus 1300 may be implemented in an AT (e.g., AT 106 in FIG. 1), or other communication devices.

Figure 14:
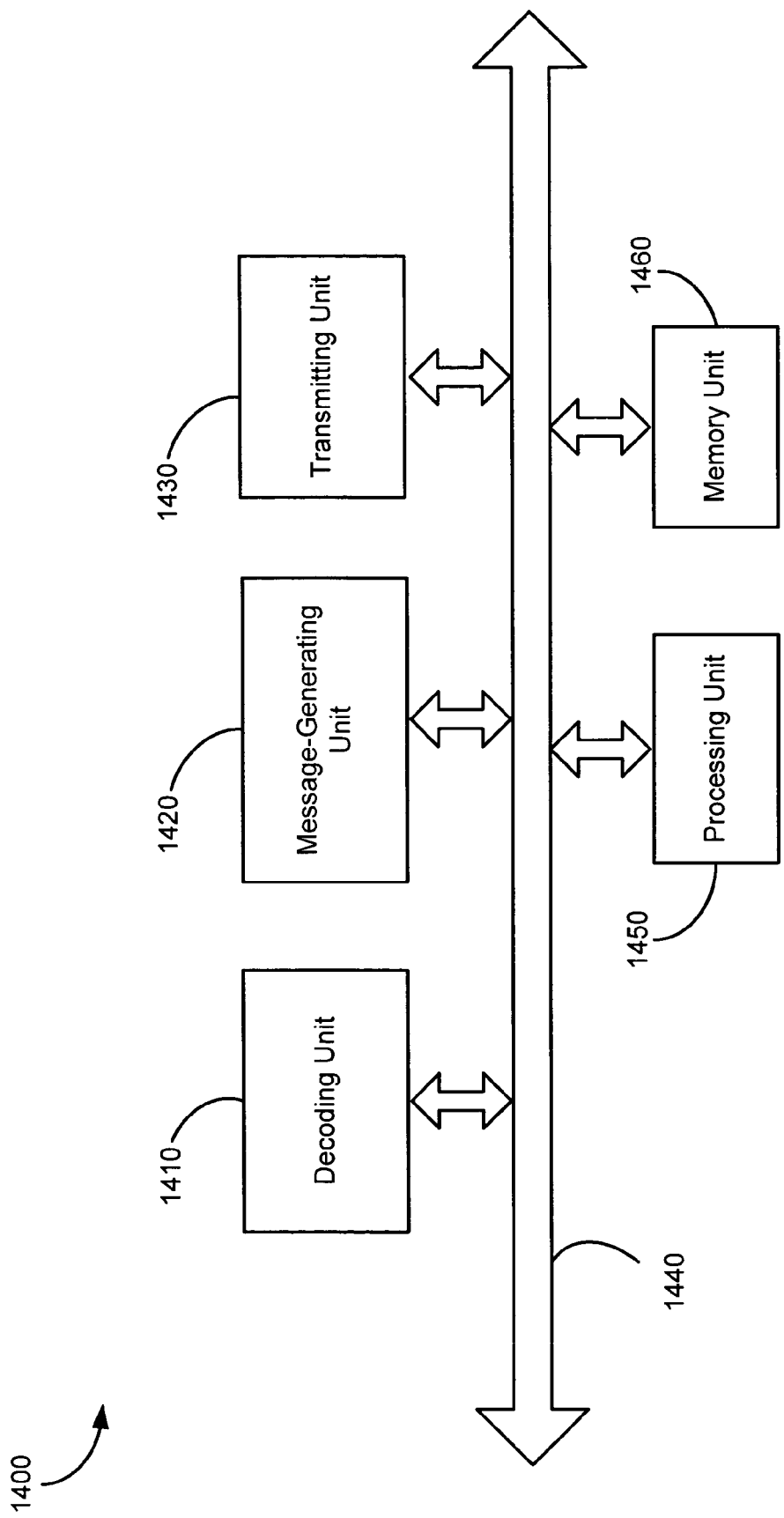
FIG. 14 illustrates a block diagram of an apparatus, in which some disclosed embodiments may be implemented.

FIG. 14 illustrates a block diagram of an apparatus 1400, which may be used to implement some disclosed embodiments (such as described above). By way of example, apparatus 1400 may include a decoding unit (or module) 1410 configured to determine the DSC value received from an AT; a message-generating unit 1420 configured to generate a message in accordance with the DSC decoding (e.g., DSCChangedInd, ForwardDesiredInd, ForwardStoppedInd message or the like, such as described above); and a transmitting unit 1430 configured to send the message thus generated to an ANC.

In apparatus 1400, decoding unit 1410, message-generating unit 1420, and transmitting unit 1430 may be coupled to a communication bus 1440. A processing unit 1450 and a memory unit 1460 may also be coupled to communication bus 1440. Processing unit 1450 may be configured to control and/or coordinate the operations of various units. Memory unit 1460 may embody instructions to be executed by processing unit 1450.

Apparatus 1400 may be implemented in an AP (e.g., AP1 or AP2 described above), or other network infrastructure elements.

Figure 15:
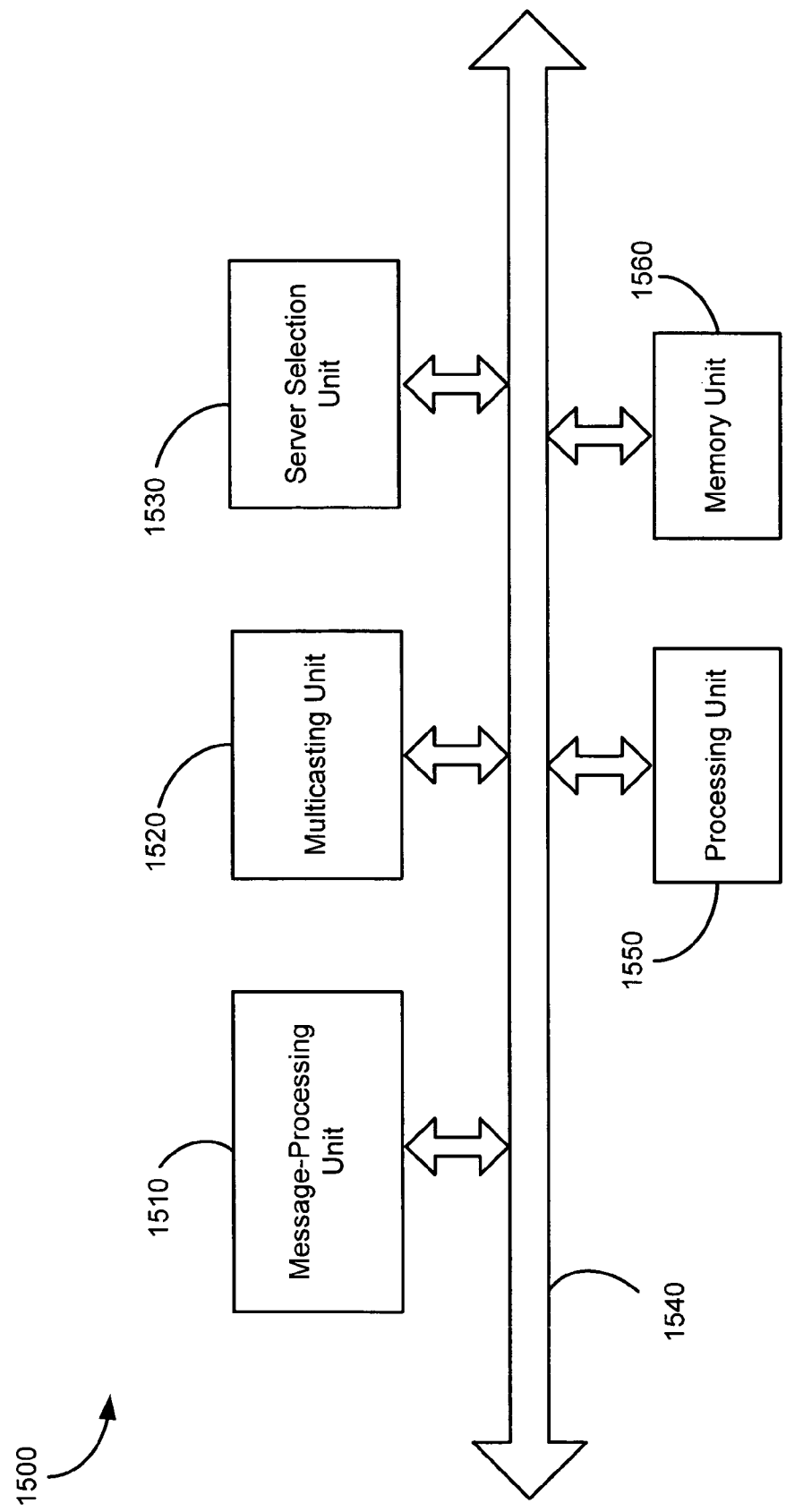
FIG. 15 illustrates a block diagram of an apparatus, in which some disclosed embodiments may be implemented.

FIG. 15 illustrates a block diagram of an apparatus 1500, which may be used to implement some disclosed embodiments (such as described above). By way of example, apparatus 1500 may include a message-processing unit (or module) 1510 configured to receive a message from an AP (e.g., DSCChangedInd, ForwardDesiredInd, or ForwardStoppedInd message from AP1 or AP2 described above); a multicasting unit 1520 configured to multicast forward traffic (e.g., EF data) associated with an AT to a plurality of APs (e.g., those in the active set of the AT); and a server selection unit 1530 configured to select an active serving AP for an AT.

In apparatus 1500, receiving unit 1510, multicasting unit 1520, and server selection unit 1530 may be coupled to a communication bus 1540. A processing unit 1550 and a memory unit 1560 may also be coupled to communication bus 1540. Processing unit 1550 may be configured to control and/or coordinate the operations of various units. Memory unit 1560 may embody instructions to be executed by processing unit 1540.

Apparatus 1500 may be implemented in an ANC (such described above), or other network controller means.

The transmit power of reverse link overhead channels (e.g., DRC, DSC, reverse rate indicator (RRI), acknowledgement (ACK) channels, etc.) may be tied at fixed offsets to the pilot transmit power. The latter may be controlled by power control, which may include an inner-loop power control and an outer-loop power control. For example, the inner-loop power control may be configured to maintain the received pilot power at an AP to be around a threshold, which may in turn be determined by the outer-loop power control. In some situations, the threshold adjustment by the outer-loop power control may be based on data channel performance. As a result, the overhead channel performance may need to be considered separately. This may be particularly important in the case of soft handoff on reverse link. The reason is that data decoding may benefit from the selection combining (e.g., combining decoding results from a plurality APs in an AT's active set) at ANC while overhead channels may not. The DRC performance may be poor especially in the presence of imbalance, where an AT points its DRC at one sector with which it has the best forward link, but is power-controlled by another sector with which it a better reverse link.

As for the DRC channel, if an AP makes a wrong decoding and schedules a packet transmission based on such, the packet may not be received by the corresponding AT and all the transmission slots may end up in waste. If the AP cannot decode the DRC channel successfully and declares a DRC erasure, the AT may not be served. In the situation of multiple users with delay insensitive (e.g., best-effort) data flows, this may cause little loss in sector capacity. Therefore, a reasonable DRC erasure rate may be tolerated in relation to a low DRC decoding error probability. During DRC decoding, the DRC candidate with the maximum received energy may be compared with a threshold. This candidate may become the DRC in effect when the energy is larger than the threshold; otherwise, a DRC erasure may be declared. Because the DRC transmit power is tied to the pilot power, the threshold on the DRC energy may be equivalent to a threshold on the received pilot power (termed "Ecp/Nt" herein). By way of example, a DRC erasure may be declared if Ecp/Nt falls below, e.g., −25 dB or so.

The sector(s) may supply AT with reverse link SINR or DRC erasure rate via a feedback loop, e.g., by way of a DRCLock bit. Each sector may set the DRCLock bit for the AT in accordance with the evaluated erasure rate. For example, a DRCLock bit of "1" ("in-lock") may indicate that the DRC erasure rate is acceptable; a DRCLock bit of "0" ("out-of-lock") may indicate that the DRC erasure rate is unacceptable.

Some mechanisms may be devised to avoid long outage for an AT suffering from consistently high erasure rate: e.g., one may be a slow mechanism using the DRCLock bit on forward link, indicating to the AT of high erasure rate and prompting the AT to handoff; another may be a fast mechanism of DRC erasure mapping, and so on.

In a "1xEV-DO Release 0" type system, for example, the DRCLock bit may be time-division-multiplexed with the power control channel. It may be transmitted once every DRCLockPeriod slots and repeated every DRCLockLength. (The equivalent feedback rate may be [600/(DRCLockPeriod×DRCLockLength)]Hz, for example.) The default values for DRCLockPeriod and DRCLockLength may be 8 slots, for example. In a "1xEV-DO Revision A" type system, the DRCLock bit may be transmitted along with the power control bit on the in-phase and the quadrature phase of the same MAC channel. The DRCLock bit may be transmitted once every 4 slots, for example. The parameter DRCLockLength may be kept for the DRCLock bit to repeat. The default value for DRCLockLength may be 16 slots, for example.

Figure 16:
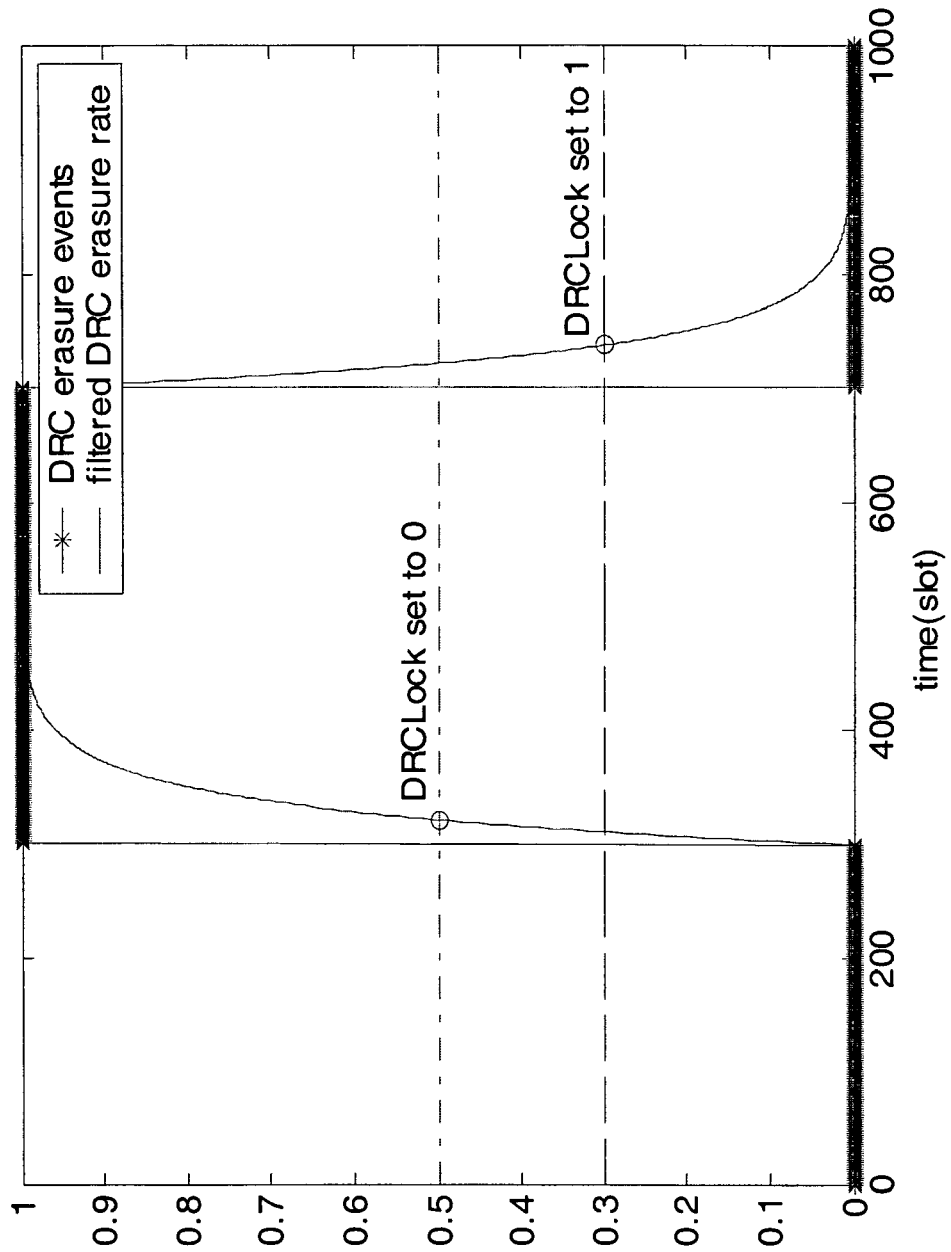
FIG. 16 illustrates an embodiment of the hysteresis associated with setting the DRCLock bit.

The value of DRCLock bit may be based on the filtered DRC erasure rate. Each DRC erasure event may be mapped to a binary value and used to update an IIR filter. The filtered value may be considered as an average DRC erasure rate. The default time constant for the IIR filter may be 32 slots, for example. A hysteresis may be present in thresholding the filtered DRC erasure rate. For example, the DRCLock bit may be set to "1" if the filtered erasure rate is below 30%; the DRC Lock bit is set to "0" if the filtered erasure rate is above 50%. FIG. 16 illustrates an embodiment of the hysteresis associated with setting the DRCLock bit, where the DRC erasure events may stay constant at either 0 (no erasure) or 1 (erasure) for a relatively long period. The filtering operation thus described may render the DRCLock bit stable, yet slowly reacting to channel variation.

The built-in delay in setting the DRCLock bit may imply a long DRC erasure run length (the time period during which consecutive DRC erasures occur). This may be taken into consideration during handoff. For EF (e.g., delay-sensitive) data, these erasures may result in an unacceptable amount of service outage. Thus, a need exists for a DRC erasure mapping algorithm configured to minimize the service outage on the forward link.

In an embodiment, a DRC erasure mapping algorithm may be performed at an AP at every DRCLength for each AT. For each AT, the algorithm may be performed at each cell which has an active queue (e.g., set up by the ANC in unicast or multicast state) for the AT. When DRC erasure mapping is activated, the flow may be eligible for "limited" forward link scheduling (e.g., only served by multi-user packets). The cost of DRC erasure mapping may arise from sending data without knowing the forward link channel quality and wasting the associated transmission slots if the AT cannot decode the packet. Therefore, in some situations, the DRC erasure mapping algorithm may be activated when all of the following are met:
  DRC erasure run length is sufficiently long.
  Packet delay seen by the scheduler is sufficiently long.

A threshold (e.g., termed "Max_Ers_Len" herein) may be associated with the DRC erasure run length. For EF data/flows (e.g., VoIP data), the setting for the threshold may be in the range of 0 to 16 slots, for example.

DRC erasure mapping needs to be robust to long DRC erasure run lengths. For example, an AT may perform a serving sector switching; however, a sector which is receiving erased DRCs may not be aware if this. In this situation, the DCS channel may be used as complementary information to assist the DRC erasure mapping decision, as further illustrated below.

Similar to the multicasting mechanism between ANC and AP (such as described above), over-the-air (OTA) multicasting may be performed from multiple sectors to an AT to enhance the robustness of a DRC erasure mapping algorithm, as further described below.

Figure 17:
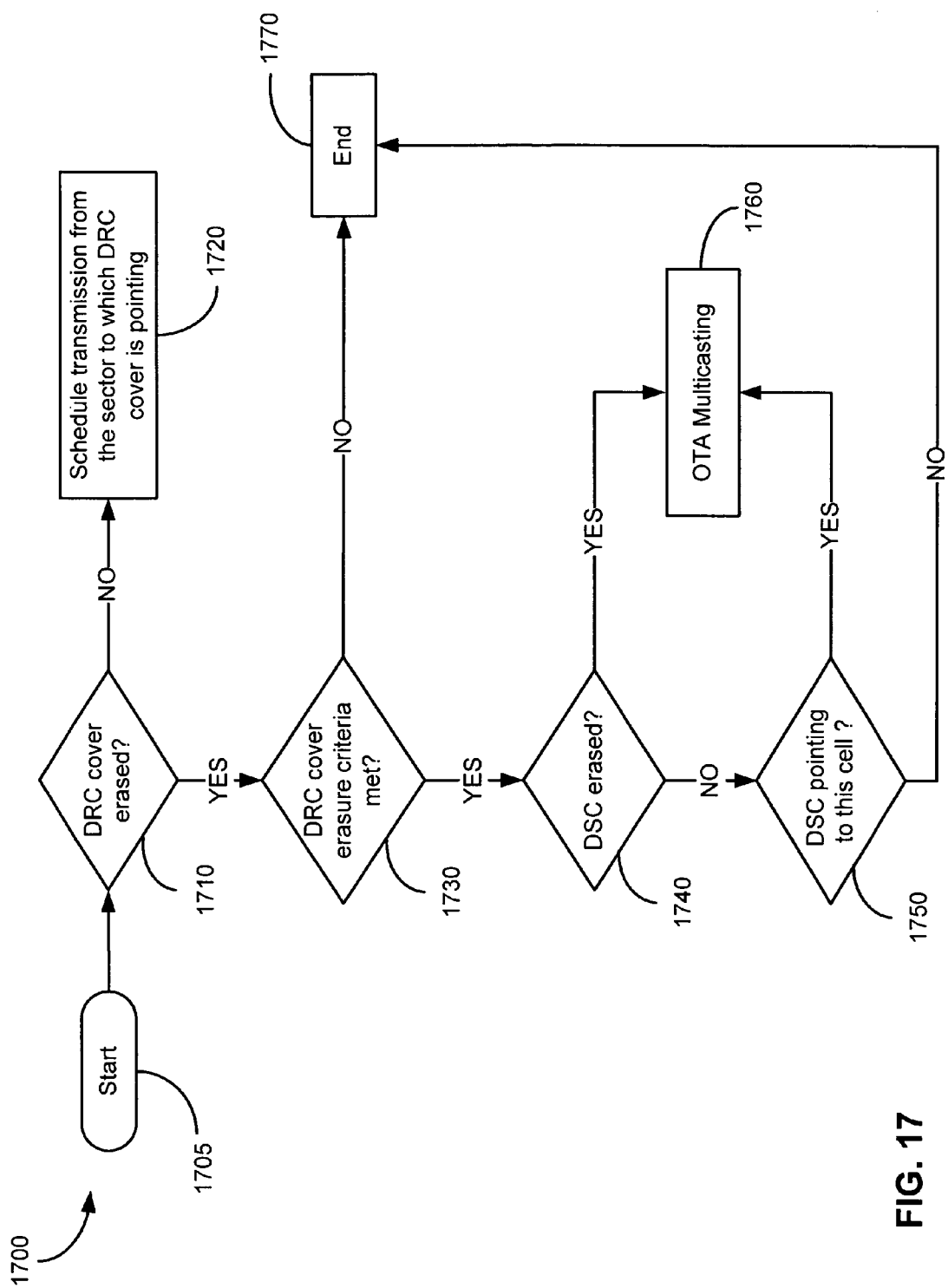
FIG. 17 illustrates a flow chart of a process in connection with DRC erasure mapping.

FIG. 17 illustrates an embodiment of a process 1700, which an AP may perform for each AT which has this AP in its active set. Process 1700 starts at step 1705. Step 1710 determines if the DRC cover received from the AT is erased. If the outcome of step 1710 is "NO," step 1720 follows and schedules transmission for the AT from the sector to which the DRC cover is pointing. If the outcome of step 1710 is "YES", step 1730 follows and determines if DRC cover erasure criteria are met for the DRC cover from the AT. The DRC cover erasure criteria may include, for example, DRC erasure run length being greater than Max_Ers_Len, etc. If the outcome of step 1730 is "YES", step 1740 follows and determines if the DSC value received from the AT is erased. If the outcome of step 1740 is "NO", step 1750 follows and determines if the DSC value corresponds to the cell serviced by the AP (termed "this cell" herein). If the outcome of step 1750 is "YES", step 1760 follows and initiates OTA multicasting (e.g., transmitting forward traffic to the AT from a plurality of sectors that are in the AT's active set and in this cell), as FIG. 19 further illustrates. If the outcome of step 1740 is "YES", process 1700 likewise proceeds to step 1760.

In process 1700, if the outcome of step 1750 is "NO", process 1700 ends at step 1770. If the outcome of step 1730 is "NO", process 1700 likewise proceeds to step 1770.

FIGS. 18A-I illustrate several processes which may be used to implement process 1700 illustrated in FIG. 17 in some embodiments. In FIG. 18A, step 1810 determines if the DRC cover received from the AT is not erased (e.g., Ecp/Nt above an erasure threshold), if the DRC cover (or "DRC_Cover") is not null, and if DRC_Cover is the same as the last successfully decoded DRC cover (termed "LDC" herein) or LDC and the second to last successfully decoded DRC cover (termed "2LDC" herein) are null. If the outcomes of all these decisions are "YES," step 1811 follows and sets the last valid DRC cover (or "Last_Valid_DRC_Cover") to be DRC_Cover and a flag associated with the DRC cover change (or "DRCCoverChangedFlag") to be zero (or "0"). DRCCoverChangedFlag may be used to indicate a consistency associated with the DRC covers received from the AT, which may be determined by comparing the DRC cover with one or more previously-received DRC covers from the AT. For example, DRCCoverChangedFlag may be set to be "0" if the DRC cover is consistent with (e.g., substantially same as or comparable to) at least one of previously-received DRC covers (e.g., LDC) from the AT. Predetermined criteria may also be applied in evaluating the consistency associated with the DRC cover, including (but not limited to) if the DRC cover is valid (e.g., not erased and not null), if the DRC cover change is due to sector switching, etc.

In FIG. 18B, step 1820 determines if DRC cover is erased (or "DRC_Erasure"). If the outcome of step 1820 is "NO,"

step 1821 follows and sets: (1) 2LDC to be LDC; (2) LDC to be DRC_Cover; (3) the last valid DRC index (or "Last_Valid_DRC_Index") to be the DRC rate (or "DRC_Rate") associated with the DRC cover; and (4) a count on the number of erasures (or "Erasure_Count") to be "0". If the outcome of step 1820 is "YES," step 1822 follows and sets Erasure_Count to be incremented by a DRCLength.

In FIG. 18C, for each active AT at time Td, step 1830 determines if the DSC value transmitted from the AT is erased, or the DSC value is invalid (e.g., having a zero value). If the outcome of step 1830 is "YES", step 1831 follows and sets a stored DSC value (or "Stored_DSC_Value") to be the DSC value associated with this cell (or "This_Cell_DSC_Value"); a flag associated with DSC erasure (or "DSC_Erased_Flag") to be one (or "1"); and a counter (or "StopDRCErasureMap_dueto_DSCErasure_Counter") to be equal to a predetermined period of time, such as Tpd (or a predetermined number of DRCLengths). If the outcome of step 1830 is "NO", step 1832 sets Stored_DSC_Value to be the decoded DSC value (or "DSC_Value") and DSC_Erased_Flag to be "0".

In FIG. 18D, step 1840 determines if Stored_DSC_Value is equal to the last valid DSC value (or "Last_Valid_DSC_Value"). If the outcome of step 1840 is "NO", step 1841 follows and sets a flag associated with updating Last_Valid_DSC_Value (or "LastValidDSCValue_needs_to_be_updated_flag") to be "1". Step 1842 subsequently determines if Stored_DSC_Value is equal to This_Cell_DSC_Value. If the outcome of step 1842 is "YES", step 1843 follows and sets Delay_Counter to be the delay (e.g., measured in unit of slots) accounted for DSC switching (or "DSCSwitchDelayInSlots"). If the outcome of step 1842 is "NO", step 1844 follows and sets Delay_Counter to be "0".

In FIG. 18E, for each active AT at every slot, step 1850 determines if DSC_Erased_Flag is "1" and StopDRCErasureMap_dueto_DSCErasure_Counter is greater than "0". If the outcome of step 1850 is "YES", step 1851 follows and decrements StopDRCErasureMap_dueto_DSCErasure_Counter by "1".

In FIG. 18F, step 1860 determines if LastValidDSCValue_needs_to_be_updated_flag is "1". If the outcome of step 1860 is "YES", step 1861 follows and determines if Delay_Counter is "0". If the outcome of step 1861 is "NO", step 1862 follows and decrements Delay_Counter by "1". If the outcome of step 1861 is "YES", step 1863 follows and sets LastValidDSCValue_needs_to_be_updated_flag to be "0" and Last_Valid_DSC_Value to be Stored_DSC_Value. Step 1864 subsequently determines if Stored_DSC_Value is the same as This_Cell_DSC_Value. If the outcome of step 1864 is "YES", step 1865 follows and sets LastValidDSC_Pointing_State to be "1". Otherwise, it is set to be "0" as shown in step 1866.

In FIG. 18G, step 1870 determines if Erasure_Count is greater than Max_Ers_Len and if LastValidDSC_Pointing_State is "1". If the outcome of step 1870 is "YES", then the AT may be eligible for DRC erasure mapping from this cell, e.g., by setting Erasure_Mapped_Flag to be "1" as shown in step 1871.

In FIG. 18H, step 1880 determines if DSC_Erased_Flag is "1" and StopDRCErasureMap_dueto_DSCErasure_Counter is "0". If the outcome of step 1880 is "YES", then the AT is not eligible for DRC erasure mapping from the cell, e.g., by setting Erasure_Mapped_Flag to be "0" as shown in step 1881.

In FIG. 18I, step 1890 determines if DRC cover is not erased and DRCCoverChangedFlag is "0". If the outcome of step 1890 is "YES", step 1891 follows and schedules transmission for the AT from the sector to which DRC_Cover is pointing and at the corresponding DRC_Rate. If the outcome of step 1890 is "NO", step 1892 follows and determines if Erasure_Mapped_Flag is "1". If the outcome of step 1892 is "YES", step 1893 follows and initiates OTA multicasting to the AT, as further described below.

Figure 19:
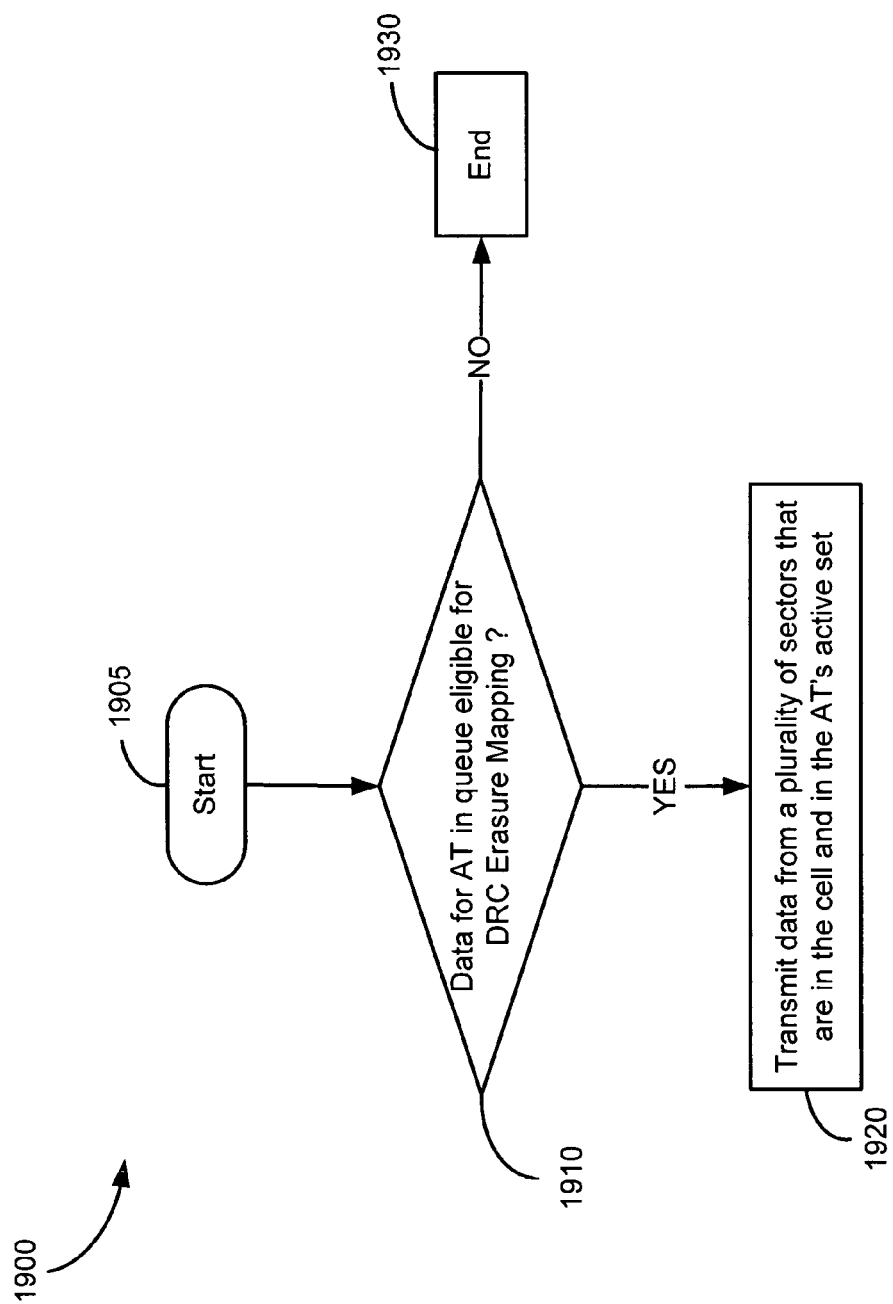
FIG. 19 illustrates a flow chart of a process, which may be used to implement features illustrated in FIG. 17 and FIGS. 18A-I.

FIG. 19 illustrates an embodiment of a process 1900, e.g., to implement the OTA multicasting step (such as described above). Process 1900 starts at step 1905. Step 1910 determines if there is any data for the AT in queue that is eligible for DRC erasure mapping (e.g., a delay sensitive flow with sufficiently long packet delay). If the outcome of step 1910 is "YES," step 1920 follows and transmits data for the AT from a plurality of the sectors that are in this cell and in the AT's active set using a particular packet format (termed "DRC-index_mapped" herein). For example, multi-user packet format compatible with a predetermined set of DRC indices may be used. If the outcome of step 1920 is "NO," process 1900 ends at step 1930.

In an embodiment, for every DRCLength interval, a forward link processor (e.g., a digital signal processor (DSP)) may receive 8 bits DRC info from a reverse link processor (e.g., a DSP), including: 1 bit DRC erasure flag indicating if Ecp/Nt is below an erasure threshold (or "DRC_Erasure"); 3 bits DRC cover (or "DRC_Cover"); 4 bits DRC rate (or "DRC_Rate"). At Tpd and Td, the forward link processor may receive the decoded DSC value (or "DSC_Value" such as described above). A DRC erasure mapping algorithm may be performed (e.g., once every DRCLength) as follows:

```
DRCCoverChangedFlag = 1;
Erasure_Mapped_Flag = 0;
If     (DRC_Erasure != Erasure) && (DRC_Cover != Null) &&
       ((DRC_Cover = = LDC) || (LDC = = 2LDC = = Null))
{
       DRCCoverChangedFlag = 0;
       Last_Valid_DRC_Cover = DRC_Cover;
}
If (DRC_Erasure != Erasure)
{
       2LDC = LDC;
       LDC = DRC_Cover;
       Last_Valid_DRC_Index = DRC_Rate;
       Erasure_Count = 0;
}
Else
{
       Erasure_Count = Erasure_Count + DRCLength;
}
For each active AT at Td:
If (DSC is erased || DSC = = 0)
{
       Stored_DSC_Value = This_Cell_DSC_Value;
       DSC_Erased_Flag = 1;
       StopDRCErasureMap_dueto_DSCErasure_Counter = Tpd;
}
Else
{
       Stored_DSC_Value = DSC_Value;
       DSC_Erased_Flag = 0;
}
If (Stored_DSC_Value != Last_Valid_DSC_Value)
{
       LastValidDSCValue_needs_to_be_updated_flag = 1
       Delay_Counter = 0;
       If (Stored_DSC_Value == This_Cell_DSC_Value)
       {
           Delay_Counter = DSCSwitchDelayInSlots;
       }
}
```

For all ATs at every slot:

```
If (DSC_Erased_Flag = = 1 &&
    StopDRCErasureMap_dueto_DSCErasure_Counter > 0)
{
    StopDRCErasureMap_dueto_DSCErasure_Counter=
    StopDRCErasureMap_dueto_DSCErasure_Counter – 1;
}
If (LastValidDSCValue_needs_to_be_updated_flag = = 1)
{
    If (Delay_Counter = = 0)
    {
        LastValidDSCValue_needs_to_be_updated_flag = 0;
        Last_Valid_DSC_Value = Stored_DSC_Value
        LastValidDSC_Pointing_State = 0;
        If (Stored_DSC_Value == This_Cell_DSC_Value)
        {
            LastValidDSC_Pointing_State = 1;
        }
    }
    Else
    {
        Delay_Counter = Delay_Counter – 1;
    }
}
Erasure Mapping Flag is set:
If ( Erasure_Count >= Max_Ers_Len) &&
(LastValidDSC_Pointing_State= = 1)
{
    Erasure_Mapped_Flag = 1;
}
If (StopDRCErasureMap_dueto_DSCErasure_Counter = =0 &&
    DSC_Erased_Flag = = 1)
{
    Erasure_Mapped_Flag = 0;
}
```

At FL scheduler, for an AT at each slot:

```
If (DRC_Erasure != Erasure && DRCCoverChangedFlag = = 0)
{
    Schedule transmission for the AT from the sector to which
    DRC_Cover is pointing and at the corresponding DRC_Rate
}
Else if (Erasure_Mapped_Flag = = 1)
{
    Initiate OTA multicasting to the AT from a plurality of the sectors
    that are in this cell and in the AT's active set with packet format
    "DRC_index_mapped"
}
```

Figure 20:
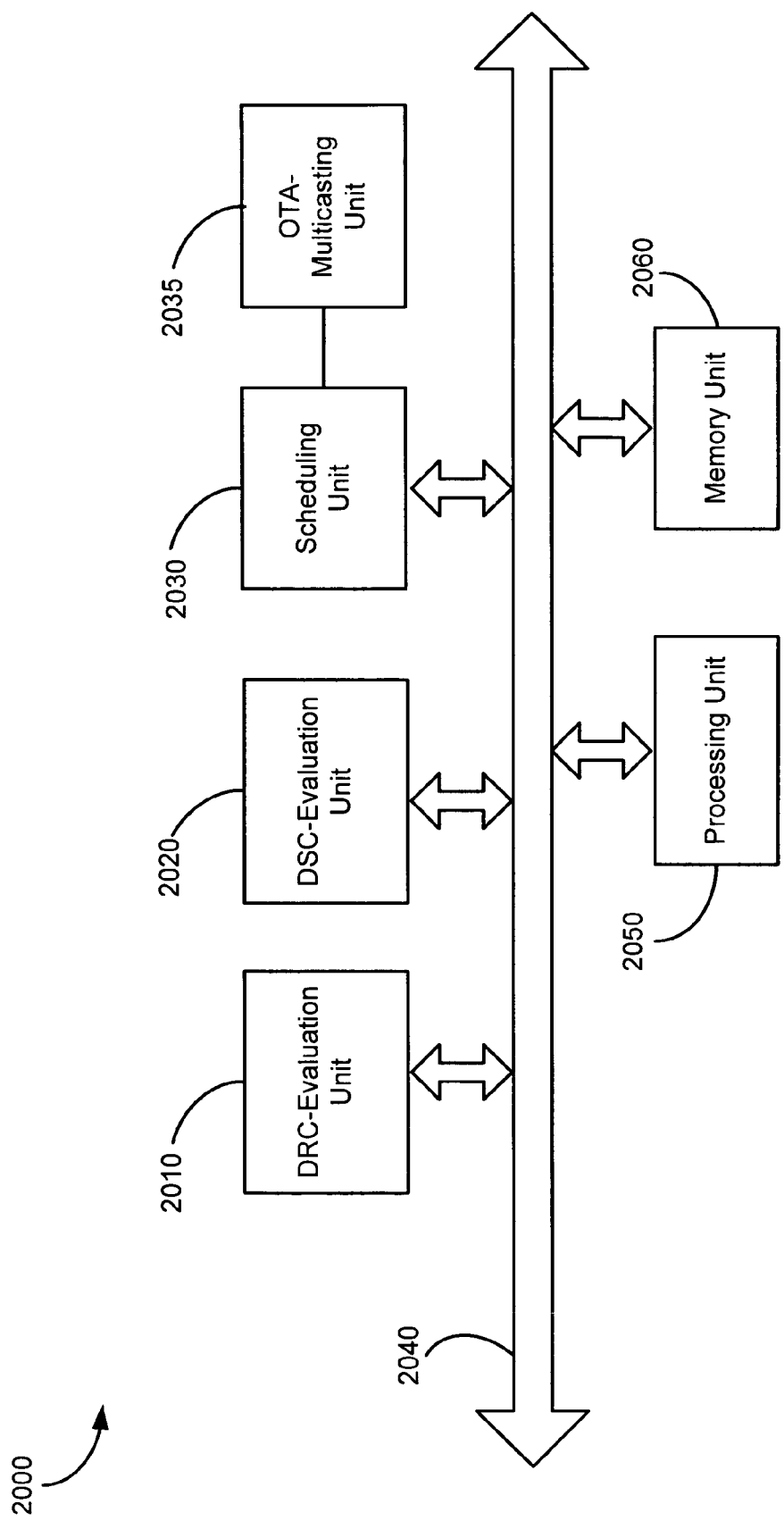
FIG. 20 illustrates a block diagram of an apparatus, in which some disclosed embodiments may be implemented.

FIG. 20 illustrates a block diagram of an apparatus 2000, which may be implemented in an AP to perform some disclosed processes (such as described above). By way of example, apparatus 2000 may include a DRC-evaluation unit (or module) 2010; a DSC-evaluation unit 2020; and a scheduling unit 2030.

In apparatus 2000, DRC-evaluation unit 2010 may be configured to determine the DRC value received from an AT; evaluate if DRC cover erasure criteria are met; evaluate the consistency of the received DRC covers; perform DRC erasure mapping, and so on (such as described above). DSC-evaluation unit 2020 may be configured to determine the DSC value received from the AT; evaluate if a DSC erasure has occurred; perform various functions in connection with DSC; and so on (such as described above). Scheduling unit 2030 may be configured to schedule transmission for the AT, such as described above. Scheduling unit 2030 may further include an OTA-multicasting unit 2035 configured to multicast forward traffic (e.g., data) to the AT from multiple sectors (such as described above).

In apparatus 2000, DRC-evaluation unit 2010, DSC-evaluation unit 2020, and scheduling unit 2030 (along with OTA-multicasting unit 2035) may be coupled to a communication bus 2040. A processing unit 2050 and a memory unit 2060 may also be coupled to communication bus 2040. Processing unit 2050 may be configured to control and/or coordinate the operations of various units. Memory unit 2060 may embody instructions to be executed by processing unit 2040.

Apparatus 2000 may be implemented in an AP, and/or other network infrastructure means.

Embodiments disclosed herein (such as described above) provide some embodiments of adaptive server section in wireless communications. There are other embodiments and implementations. Various embodiments disclosed herein may be implemented in AT, AP, ANC, and/or other network infrastructure elements.

Various units/modules and embodiments disclosed herein may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (or a processing unit). The memory unit may be implemented within the processor or external to the processor, in which case it can be communicatively coupled to the processor via various means known in the art.

Various disclosed embodiments may be implemented in a controller, an AT, and other means for providing broadcast/multicast services. Embodiments disclosed herein may be applicable to a data processing system, a wireless communication system, a unidirectional broadcast system, and any other system desiring efficient transmission of information.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for wireless communications, comprising:
    determining if a data rate control (DRC) cover received from an access terminal is erased and a DRC erasure criteria related to the DRC cover is met;
    determining, if the DRC cover is erased and said DRC erasure criteria is determined met, if a data source control (DSC) value received from the access terminal is erased; and
    scheduling transmission for the access terminal from a sector associated with the DRC cover, if the DRC cover is determined not erased.

2. The method of claim 1, further comprising determining, if the DSC value is determined not erased if the DSC value is associated with a cell serviced by an access point.

3. The method of claim 2, further comprising multicasting, if the DSC value is determined associate with a cell serviced by an access point, forward traffic to the access terminal from a plurality of sectors that are in said cell.

4. The method of claim 1, further comprising multicasting, if the DSC value is determined erased, forward traffic to the access terminal from a plurality of sectors.

5. The method of claim 1, wherein the DRC cover erasure criteria include a DRC erasure run length being greater than a predetermined threshold.

6. The method of claim 1, further comprising setting a last valid DRC cover to be the DRC cover, if the DRC cover is not erased and not null, and is equal to a last successfully decoded DRC cover.

7. The method of claim 1, further comprising setting a last successfully decoded DRC cover to be the DRC cover and a last valid DRC index to be a DRC rate corresponding with the DRC cover, if the DRC cover is not erased.

8. The method of claim 1, further comprising incrementing a count associated with a number of DRC erasures by a predetermined number, if the DRC cover is erased.

9. The method of claim 1, further comprising setting a DSC value for a cell serviced by an access point, to be a stored DSC value, if the DSC is erased.

10. The method of claim 1, further comprising setting a stored DSC value to be a decoded DSC value, if the DSC value is not erased.

11. The method of claim 1, further comprising setting a flag associated with updating a last valid DSC value to be a predetermined number, if a stored DSC value is not equal to a last valid DSC value.

12. The method of claim 11, further comprising setting a delay counter to be a predetermined number, if the stored DSC value is equal to a DSC value for a cell serviced by an access point.

13. An apparatus adapted for wireless communications, comprising:
    means for determining if a data rate control (DRC) cover received from an access terminal is erased;
    means for determining if a DRC erasure criteria for the DRC cover is met;
    means for determining if a data source control (DSC) value received from the access terminal is erased; and
    means for scheduling transmission for the access terminal from a sector associated with the DRC cover, if the DRC cover is not erased.

14. The apparatus of claim 13, wherein the determining if DRC cover erasure criteria for the DRC cover are met is in response to determining the DRC cover is erased.

15. The apparatus of claim 14, wherein the determining if a data source control (DSC) value received from the access terminal is erased is in response to determining the DRC cover erasure criteria are met.

16. The apparatus of claim 15, further comprising means for determining if the DSC value is associated with a cell serviced by an access point, if the DSC value is not erased.

17. The apparatus of claim 16, further comprising means for multicasting forward traffic to the access terminal from a plurality of sectors that are in the cell serviced by the access point and in an active set of the access terminal, if the DSC value is associated with the cell.

18. The apparatus of claim 15, further comprising means for multicasting forward traffic to the access terminal from a plurality of sectors that are in a cell serviced by an access point and in an active set of the access terminal, if the DSC value is erased.

19. A method for wireless communications, comprising:
    determining if a data rate control (DRC) cover received from an access terminal is erased;
    comparing the DRC cover with at least one of previously-received DRC covers from the access terminal; and
    scheduling transmission to the access terminal if the DRC cover is not erased and if the DRC cover is consistent with the at least one of previously-received DRC covers based on the comparison.

20. The method of claim 19, wherein the at least one of previously-received DRC covers includes a last successfully decoded DRC cover.

21. The method of claim 19, further comprising determining if the access terminal is eligible for DRC erasure mapping, if the DRC cover is erased or if the DRC cover is not consistent with the at least one of previously-received DRC covers based on the comparison.

22. The method of claim 21, wherein the access terminal is eligible for DRC erasure mapping, if a DRC erasure run length is greater than a predetermined threshold and if a stored DSC value is equal to a DSC value associated with a cell serviced by an AP.

23. The method of claim 21, wherein the access terminal is not eligible for DRC erasure mapping, if a data source control (DSC) value received from an access terminal is erased or invalid, and if a predetermined period of time has elapsed.

24. The method of claim 21, further comprising multicasting forward traffic to the access terminal from a plurality of sectors that are in a cell serviced by an access point and in an active set of the access terminal, if the access terminal is eligible for DRC erasure mapping.

25. An apparatus adapted for wireless communications, comprising:
  means for determining if a data rate control (DRC) cover received from an access terminal is erased;
  means for comparing the DRC cover with at least one of previously-received DRC covers from the access terminal; and
  means for scheduling transmission to the access terminal if the DRC cover is not erased and if the DRC cover is consistent with the at least one of previously-received DRC covers based on the comparison.

26. The apparatus of claim 25, wherein the at least one of previously-received DRC covers includes a last successfully decoded DRC cover.

27. The apparatus of claim 25, further comprising means for determining if the access terminal is eligible for DRC erasure mapping, if the DRC cover is erased or if the DRC cover is not consistent with the at least one of previously-received DRC covers based on the comparison.

28. The apparatus of claim 27, wherein the access terminal is eligible for DRC erasure mapping, if a DRC erasure run length is greater than a predetermined threshold and if a stored DSC value is equal to a DSC value associated with a cell serviced by an access point.

29. The apparatus of claim 27, further comprising means for multicasting forward traffic to the access terminal from a plurality of sectors that are in a cell serviced by an access point and in an active set of the access terminal, if the access terminal is eligible for DRC erasure mapping.

30. A non-transitory computer readable storage medium containing information readable by a computer, the information comprising:
  instructions to determine if a data rate control (DRC) cover received from an access terminal is erased;
  instructions to compare the DRC cover with at least one of previously-received DRC covers from the access terminal; and
  instructions to schedule transmission to the access terminal if the DRC cover is not erased and if the DRC cover is consistent with the at least one of previously-received DRC covers based on the comparison.

31. The method of claim 2, further comprising multicasting, if the DSC value is determined associated with a cell serviced by an access point, forward traffic to the access terminal from a plurality of sectors that are in said cell serviced by the access point and in an active set of the access terminal.

32. The method of claim 1, further comprising multicasting, it the DSC value is determined erased, forward traffic to the access terminal from a plurality of sectors that are in a cell serviced by an access point and in an active set of the access terminal.

33. The method of claim 1, further comprising: determining if the DSC value is invalid and, if determined invalid, setting a DSC value for a cell serviced by an access point to be a stored DSC value.

34. The method of claim 1, further comprising: determining if the DSC value is invalid and, if determined not invalid, setting a stored DSC value to be a decoded DSC value.

35. A wireless communications device, comprising:
  at least one processor configured to:
  determine if a data rate control (DRC) cover received from an access terminal is erased and a DRC erasure criteria related to the DRC cover is met;
  determine, if the DRC cover is erased and said DRC erasure criteria is determined met, if a data source control (DSC) value received from the access terminal is erased; and
  schedule transmission for the access terminal from a sector associated with the DRC cover, if the DRC cover is determined not erased.

36. A non-transitory computer readable storage medium containing information readable by a computer, the information comprising:
  instructions to determine if a data rate control (DRC) cover received from an access terminal is erased and a DRC erasure criteria related to the DRC cover is met;
  instructions to determine, if the DRC cover is erased and said DRC erasure criteria is determined met, if a data source control (DSC) value received from the access terminal is erased; and
  instructions to schedule transmission for the access terminal from a sector associated with the DRC cover, if the DRC cover is determined not erased.

37. A wireless communications device, comprising:
  at least one processor configured to:
  determine if a data rate control (DRC) cover received from an access terminal is erased;
  compare the DRC cover with at least one of previously-received DRC covers from the access terminal; and
  schedule transmission to the access terminal if the DRC cover is not erased and if the DRC cover is consistent with the at least one of previously-received DRC covers based on the comparison.

* * * * *